US007819030B2

(12) United States Patent
Magnussen et al.

(10) Patent No.: US 7,819,030 B2
(45) Date of Patent: Oct. 26, 2010

(54) HYBRID MANUAL-ELECTRONIC PIPETTE

(75) Inventors: Haakon T. Magnussen, Orinda, CA (US); James S. Petrek, Danville, CA (US); William D. Homberg, Oakland, CA (US)

(73) Assignee: Rainin Instrument, LLC, Oakland, CA (US)

( * ) Notice: Subject to any disclaimer, the term of this patent is extended or adjusted under 35 U.S.C. 154(b) by 351 days.

(21) Appl. No.: 11/906,180

(22) Filed: Sep. 27, 2007

(65) Prior Publication Data

US 2009/0000351 A1 Jan. 1, 2009

Related U.S. Application Data

(60) Provisional application No. 60/947,367, filed on Jun. 29, 2007.

(51) Int. Cl.
*B01L 3/02* (2006.01)
*G01F 25/00* (2006.01)

(52) U.S. Cl. .................. 73/864.16; 73/1.74; 73/863.01; 73/863.02

(58) Field of Classification Search .................. 73/1.74, 73/863.01–863.03, 864.16, 864.18
See application file for complete search history.

(56) References Cited

U.S. PATENT DOCUMENTS

| | | | | |
|---|---|---|---|---|
| 3,687,632 | A * | 8/1972 | Natelson | 73/864.25 |
| 3,827,305 | A | 8/1974 | Gilson | |
| 4,567,780 | A | 2/1986 | Oppenlander | |
| 4,743,902 | A | 5/1988 | Andermo | |
| 4,763,535 | A | 8/1988 | Rainin | |
| 4,821,586 | A * | 4/1989 | Scordato et al. | 73/864.18 |
| 4,909,991 | A | 3/1990 | Oshikubo | |
| 5,187,990 | A | 2/1993 | Magnussen | |
| 5,892,161 | A | 4/1999 | Conley | |
| 6,005,387 | A | 12/1999 | Andermo | |
| 6,254,832 | B1 | 7/2001 | Rainin | |
| 6,313,460 | B1 | 11/2001 | Haas | |
| 6,428,750 | B1 | 8/2002 | Rainin | |
| 6,440,370 | B1 * | 8/2002 | Blum et al. | 73/864.16 X |
| 6,601,433 | B2 | 8/2003 | Kriz | |
| 7,175,813 | B2 | 2/2007 | Petrek | |
| 7,396,512 | B2 * | 7/2008 | DiTrolio et al. | 422/100 |
| 2007/0199390 | A1 | 8/2007 | Viot | |

FOREIGN PATENT DOCUMENTS

| | | | |
|---|---|---|---|
| WO | WO 2004020096 | A1 * | 3/2004 |
| WO | WO 2005093787 | A1 * | 10/2005 |

OTHER PUBLICATIONS

U.S. Appl. No. 11/906,140, filed Sep. 27, 2007, Magnussen.
U.S. Appl. No. 11/906,187, filed Sep. 27, 2007, Magnussen.
U.S. Appl. No. 11/906,178, filed Sep. 27, 2007, Magnussen.

* cited by examiner

*Primary Examiner*—Thomas P Noland
(74) *Attorney, Agent, or Firm*—Clarke A. Wixon

(57) ABSTRACT

A hybrid manual-electronic pipette combines a manually driven piston with real-time electronic measurement of liquid volume and piston displacement while compensating for both pipette-specific and pipette model-specific variations. The hybrid nature of the pipette facilitates increased accuracy and improved ease of use, and enables additional functionalities not practicable with traditional manual pipettes.

43 Claims, 23 Drawing Sheets

*Fig.* 22

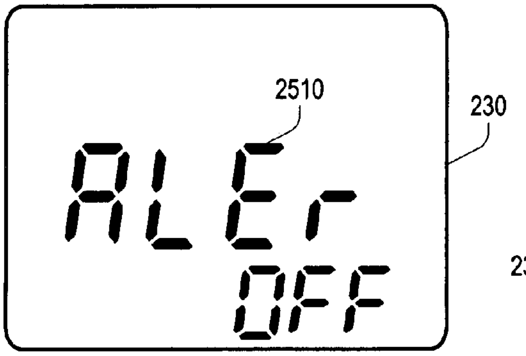
*Fig.* 25
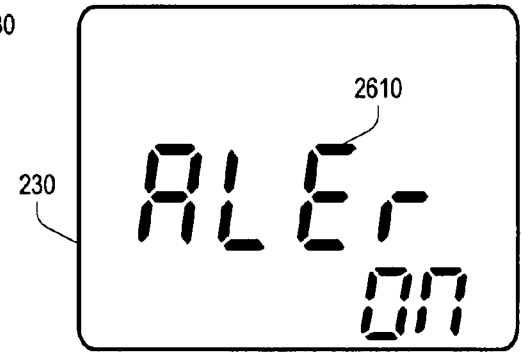
*Fig.* 26
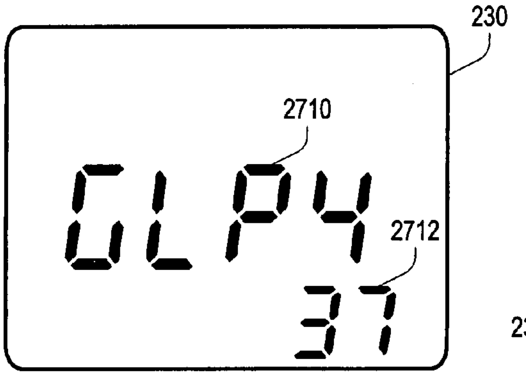
*Fig.* 27
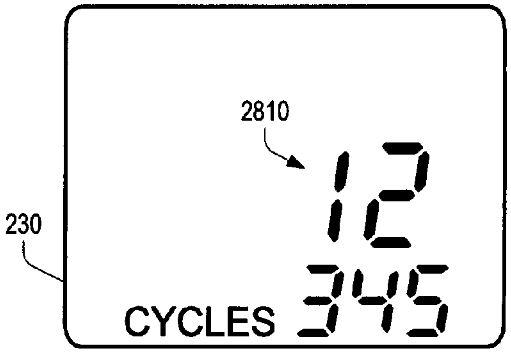
*Fig.* 28

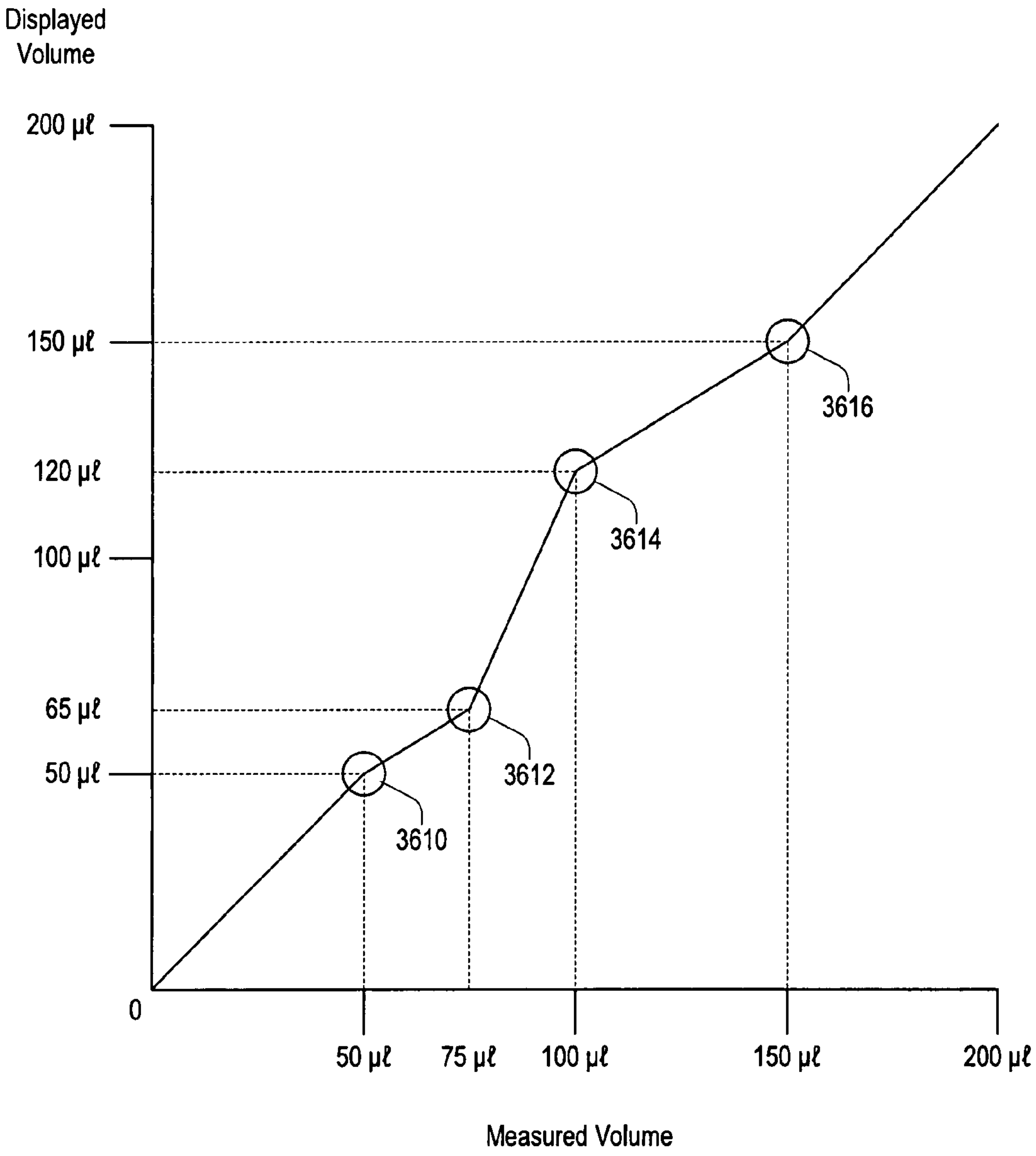
*Fig.* 36

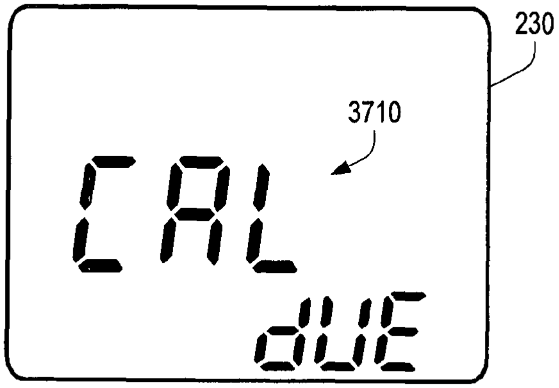
*Fig.* 37
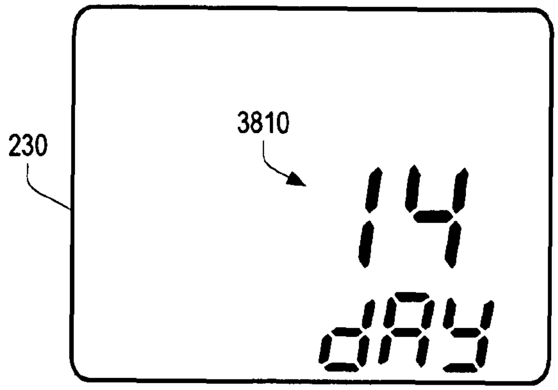
*Fig.* 38

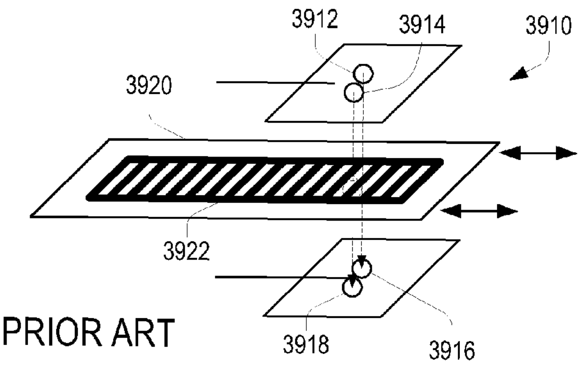
PRIOR ART
*Fig.* 39
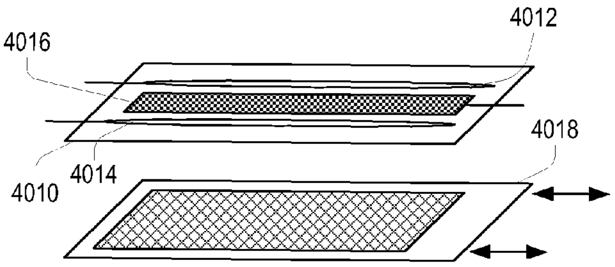
PRIOR ART
*Fig.* 40
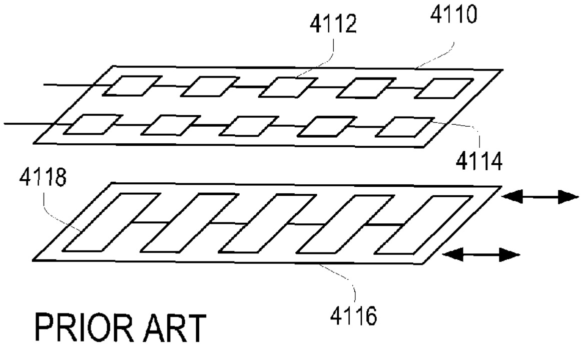
PRIOR ART
*Fig.* 41

*Fig.* 43

HYBRID MANUAL-ELECTRONIC PIPETTE

CROSS-REFERENCE TO RELATED APPLICATION

This application claims the benefit under 35 U.S.C. Section 119(e) of U.S. Provisional Application No. 60/947,367, filed on Jun. 29, 2007 and entitled "HYBRID MANUALLY-OPERATED PIPETTE WITH ELECTRONIC VOLUME MEASUREMENT," which is owned by the assignee of the present invention and is hereby incorporated by reference in its entirety.

BACKGROUND OF THE INVENTION

The present invention relates to volume adjustable manual pipettes and, more particularly, to a manually-operated pipette equipped with an electronic piston position sensor and user interface.

U.S. Pat. No. 3,827,305 ("the '305 patent") describes one of the earliest commercially available digitally adjustable air displacement pipettes. To provide for volume adjustment, the pipette includes a threaded shaft extending through a fixed nut. Manual turning of the shaft produces axial movement of a stop member for limiting axial movement of a plunger to define a volume setting for the pipette. The volume setting is displayed on a mechanical micrometer display comprising a series of indicator rings each encircling the threaded shaft.

U.S. Pat. No. 4,909,991 describes a later commercially available single channel manual pipette manufactured by Nichiryo Co. Ltd., Tokyo, Japan. The Nichiryo pipette includes an elongated hand-holdable housing for an upwardly spring biased plunger. An upper end of the plunger extends above a top of the housing and carries a control knob for thumb and finger engagement in manually turning the plunger and for axially moving the plunger in the pipette housing between an upper stop and a lower stop at which all liquid within a tip secured to a lower end of the housing is expelled by the downward movement of the plunger. The upper stop is axially adjustable within the housing in response to a turning of a hollow volume adjustment screw or shaft keyed to the plunger. The axial adjustment of the upper stop adjusts the volume of liquid that the pipette is capable of drawing into the tip in response to upward movement of the plunger to the upper stop. The pipette also includes a lock mechanism including a lock knob for locking the plunger against rotation to thereby set the upper stop in a fixed position and hence set the volume adjustment for the pipette.

In pipettes such as these, the volume setting is typically read from a stacked series of indicator rings, each bearing the digits from zero to nine. The least significant (usually bottommost) ring is coupled to the position of the volume adjustment screw, and is calibrated such that a single-unit change in the pipette volume (as defined by the position of the upper stop) will be reflected by a single-unit change in the digit shown on the coupled ring. The remaining rings serve as counters of tens, hundreds, or thousands of the increment shown in the least significant ring.

Now, more than thirty years after volume indicator of the ''305 patent made its initial appearance, the most common manual pipettes still use mechanical volume indicators very similar in operation to the one disclosed therein. It will be appreciated, however, that mechanical volume indicators such as these have several shortcomings. A mechanically coupled indicator will have some degree of slack, or backlash, resulting from the linkage between the screw that sets the upper stop and the displayed digits. If a user turns the screw in one direction to reach a desired setting but overshoots, it may be difficult for small adjustments in the opposite direction to be registered in the volume indication because of this effect. Moreover, with strictly mechanical arrangements such as the one disclosed in the '305 patent, it is difficult to accurately compensate for any nonlinearities present in the volume settings, for example at very small volumes compared to the total capacity of the pipette, even when those nonlinearities are known in advance and consistent across a manufactured lot of pipettes. And when non-linearities are inconsistent and arise from manufacturing variances, it is nearly impossible to compensate fully with a mechanical apparatus.

U.S. Pat. No. 6,601,433 describes the commercially available "Ovation" pipettes sold by Vistalab Technologies, Inc. In these pipettes, and as described in the patent, the volume adjusting upper stop is positioned by an electric motor drive mechanism with a digital control. The digital control enables calibration of volume settings, but because there is no electronic sensing of the manually operated plunger position, the precise position of the plunger cannot be ascertained at any given time, and accordingly, accurate calibration of the volume adjusting upper stop might not always be reflected in the results of using the pipette. Moreover, the motor drive apparatus imparts unnecessary complexity to the device and requires a significant amount of power to operate, and consequently, reasonably capacious batteries are also needed. Both the motor drive and the batteries add size, weight, and considerable expense to the pipette.

PCT Publication No. WO 2005/093787 A1 describes the "Ultra" Pipette available from Gilson, SAS, of Villiers le Bel, France. The Gilson Ultra pipette uses conductive tracks and corresponding contact brushes to send sequences of pulses to a microprocessor when the volume adjustment screw is turned. In this manner, by counting pulses, the microprocessor can identify when the adjustment screw is moved either up or down, and based on prior position information a new position can be calculated. But as a result of this design, the microprocessor cannot determine the absolute position of the stop with no prior data. If power is removed or a malfunction occurs, the volume reading must be recalibrated by moving the adjustment screw to a known position and resetting the pipette, and as with traditional pipette adjustment mechanisms, it can take many turns of the screw to accomplish this. Moreover, the brush-on-track encoder design is susceptible to wear and unreliability over the course of time, and because the encoder is mechanically linked to the adjustment mechanism, slack and backlash can occur.

Other volume adjustable manual pipettes with electronic digital displays have been developed and are disclosed in U.S. Pat. Nos. 4,567,780; 4,763,535; and 5,892,161.

For a more complete understanding of the current state of the art relative to the volume adjustability of manual pipettes, each of the above-identified patents is incorporated by reference into this application.

U.S. Pat. No. 6,428,750 issued Aug. 6, 2002 to the assignee of the present invention, and U.S. Pat. No. 7,175,813 issued Feb. 13, 2007 also to the assignee of the present invention, describe an improved volume adjustable manual pipette having a quick set volume adjustment mechanism and a plunger position sensor. The volume setting of the pipette is monitored by the sensing and control circuitry to provide a real time display of the volume setting of the pipette on the electronic digital display. While the quick set and volume display features represent a considerable advance in the art of manual pipettes, the described pipette does not contemplate enhanced pipetting functionality beyond the ability to quickly change volume settings, or improved calibration techniques reducing the likelihood of mechanical slack or unreliability to affect the utility of the pipette.

There is a continuing need for a volume adjustable manually operated pipette including an accurate and highly visible display of pipetting volume. A pipette capable of measuring the position of a manually driven plunger unit, calibrating that measurement, and displaying the position in real-time meets this need, and the real-time measurement, calibration, and display would enable enhanced functionality over traditional manually operated pipettes.

SUMMARY OF THE INVENTION

Accordingly, a manually operated pipette according to the invention addresses the shortcomings of presently commercially available handheld pipettes, and adds additional functionality not practicable using traditional manual pipettes.

One embodiment of a hybrid manual-electronic pipette according to the present invention comprises a plunger mounted for manual movement in a housing to and from a stop to aspirate a fluid into and dispense the fluid from a tip extending from the housing. The pipette is further provided with a real-time electronic sensor, a low-power microcontroller, and a simple yet flexible user interface.

The electronic sensor permits the position of a piston to be sensed and communicated to the user in real time via a user interface. A processor integral with the pipette allows various calculations to be performed on the piston position, including the advantageous use, communication, and manipulation of liquid volume measurements, pipetting technique analysis, use observation and auditing consistent with preferred laboratory practices, performance optimization, calibration offsets, multi-point non-linear calibration, and cycle counting.

It will be noted that manual pipettes have continued to be popular systems of choice due to their lower cost and ultimate control that the user has in choosing how to manually push the plunger down. Manual systems however lack any form of feedback in terms of exactly where the plunger is positioned and hence the actual volume being aspirated or dispensed.

The hybrid pipette according to the invention represents an advancement in manual pipette development that retains the control and feel of a traditional, ergonomic manual pipette with the addition of being able to determine the exact position of the plunger and display this to the user. This technology enables an LCD to display, in real time, the volume that is being aspirated or dispensed by the pipette.

Real time position sensing is a well known technology associated with many industrial systems. Common industrial applications include control systems, robotics, machine tools, and measurement equipment. Besides industrial applications position sensing is often used in automotive steering, braking and throttle systems. In many laboratories, equipment position sensing can often be found in pump systems and in the positioning mechanisms of larger liquid handling robot systems. Heretofore, such sensing capabilities have not been advantageously employed in low-cost handheld pipettes.

In a hybrid pipette according to the invention, the real time positioning sensor is used to monitor the precise position of the piston, and therefore the plunger. The position of the plunger/piston, which relates directly to an associated liquid volume, can be displayed directly on the LCD. Current manual pipettes with electronic readouts generally monitor the position of the upper stop but cannot tell the user where the plunger (or piston) is positioned.

This real time sensing of the piston/plunger in a hybrid pipette according to the invention gives rise to a number of unique features that currently have been unavailable in any manual pipette.

A hybrid pipette according to the invention can display the amount of liquid being aspirated into the pipette tip or it can display the amount of liquid being dispelled from the tip. Accordingly, a user of a manual pipette can perform tasks like titrating, diluting, multi-dispensing and measuring an unknown amount of liquid.

A hybrid pipette according to the invention can determine whether an acceptable pipette technique is being used by sensing whether a sample has been blown out correctly or if plunger movement is too rapid. This can be very beneficial for teaching new users.

With electronic memory, the pipette can alert the user to when the next scheduled service is due, providing a unique GLP function in a manual pipette.

The real time sensing capability in a hybrid pipette according to the invention allows multiple calibration and compensation functions to be used (like the EDP-1 and EDP-3 Electronic Pipette families from Rainin Instrument, LLC, of Oakland, Calif.) as opposed to a single offset as used in standard manual pipettes. In an embodiment of the invention, a piston position correction function, a volume correction function, and an optional user calibration function can all be employed to improve or customize the performance of the pipette.

Moreover, the real time sensing in a hybrid pipette according to the invention allows for a real pipette cycle counter to be used. The cycle counter in not simply counting plunger depressions but only counts a pipetting cycle if a complete pipette cycle has been observed without errors.

In a pipette according to an embodiment of the invention, an axially moveable volume setting member in the housing defines the stop and a volume setting for the pipette and is axially moveable by a user turnable volume adjusting member. The plunger is coupled to an air displacement piston and a highly accurate and reliable electronic position sensor component, which in turn allows measurements to be provided to a low-power microcontroller and display, thereby enabling real-time feedback on the position of the plunger, calibration of volume settings based not only on the position of the volume adjusting stop but also on the actual position of the plunger and the air displacement piston, and numerous enhanced pipetting functionality modes and capabilities not practicable with traditional fully mechanical pipettes or current state-of-the-art manual pipettes with electronic displays. The direct and tight (i.e. substantially free of slack) coupling of the plunger to the air displacement piston and sensor component eliminates mechanical backlash, while the microcontroller and user interface facilitate increased utility and ease of use. Multiple calibration functions permit the highly accurate and precise operation, by compensating not only for position sensor signal variations from pipette to pipette, but also for the non-linear but relatively invariant physical characteristics of small volumes of liquids and how they interact with the liquid end of a pipette.

Accordingly, then, a hybrid manual-electronic pipette according to the invention includes a manually-operated piston and an electronic piston displacement sensor coupled to the piston, a fluid-tight liquid end with a distal opening permitting fluid to be picked up or discharged through the opening in response to movement of the piston within the liquid end, and a processing unit. The processing unit receives signals from the electronic piston displacement sensor and causes a compensation subsystem to apply a position compensation function (to correct position measurement signals obtained from the piston displacement sensor) and a volume compensation function (to compensate for the physical characteristics inherent in handling small volumes of liquids), thereby converting the piston displacement sensor signal to an adjusted liquid volume value. The adjusted liquid volume value can then be used by the processing unit to perform certain tasks, or can be displayed to the user.

As described herein, the invention is particularly applicable to air-displacement pipettes, though it should be noted that the structures and functions described herein are also applicable to positive-displacement pipettes.

BRIEF DESCRIPTION OF THE DRAWINGS

These and other objects, features, and advantages of the invention will become apparent from the detailed description below and the accompanying drawings, in which:

FIG. 25 is a view of a user interface display in a hybrid manual-electronic pipette according to the invention with a display indicating that the technique analysis function of FIG. 21 is deactivated;

FIG. 26 is a view of a user interface display in a hybrid manual-electronic pipette according to the invention with a display indicating that the technique analysis function of FIG. 21 is activated;

FIG. 27 is a view of a user interface display in a hybrid manual-electronic pipette according to the invention with a display indicating that a fourth selectable Good Laboratory Practice cycle counter is active and 37 days remain until a scheduled service is due;

FIG. 28 is a view of a user interface display in a hybrid manual-electronic pipette according to the invention with a display indicating that a total of 12,345 pipetting cycles have been performed;

FIG. 36 is a graph illustrating an exemplary user-calibration scenario with adjusted anchor points at 75 and 100 microliters and with anchor points at 50 and 150 microliters at their default positions;

FIG. 37 is a view of a user interface display in a hybrid manual-electronic pipette according to the invention with a display indicating a scheduled service is due;

FIG. 38 is a view of a user interface display in a hybrid manual-electronic pipette according to the invention with a display indicating scheduled service is due within 14 days;

FIG. 39 is a schematic view of a position sensor for a hybrid manual-electronic pipette according to the invention employing an optical transducer;

FIG. 40 is a schematic view of a position sensor for a hybrid manual-electronic pipette according to the invention employing an inductive transducer;

FIG. 41 is a schematic view of a position sensor for a hybrid manual-electronic pipette according to the invention employing a capacitive transducer;

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
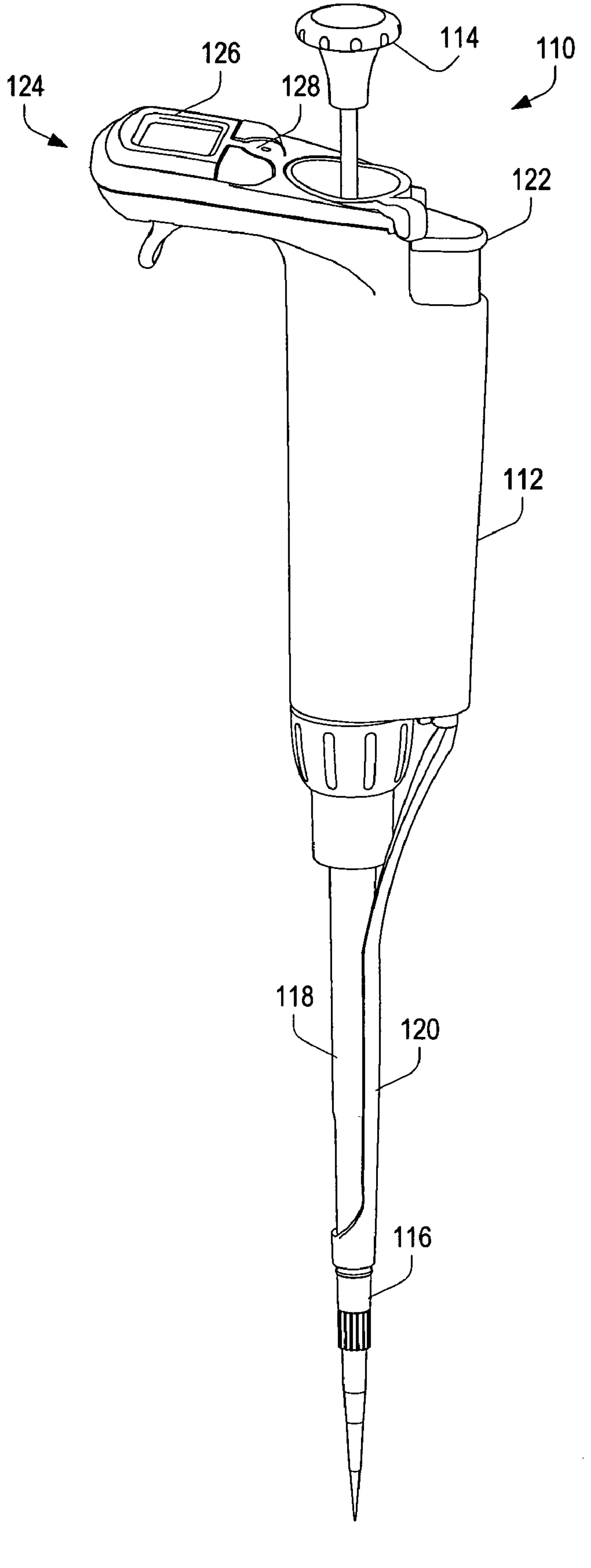
FIG. 1 is an external view of a hybrid manual-electronic pipette according to the invention, with a disposable tip mounted to a liquid end of the pipette.

Referring initially to FIG. 1, an overview illustration of a hybrid manual-electronic pipette 110 according to the invention is presented. In general configuration, the hybrid manual-electronic pipette 110 is similar to a traditional pipette, in that a user grips a handheld body 112 of the pipette 110 and manipulates a spring-loaded plunger button 114 to control the intake and discharge of fluids through a disposable tip 116, which is coupled to a liquid end 118 of the pipette 110.

Figure 4:
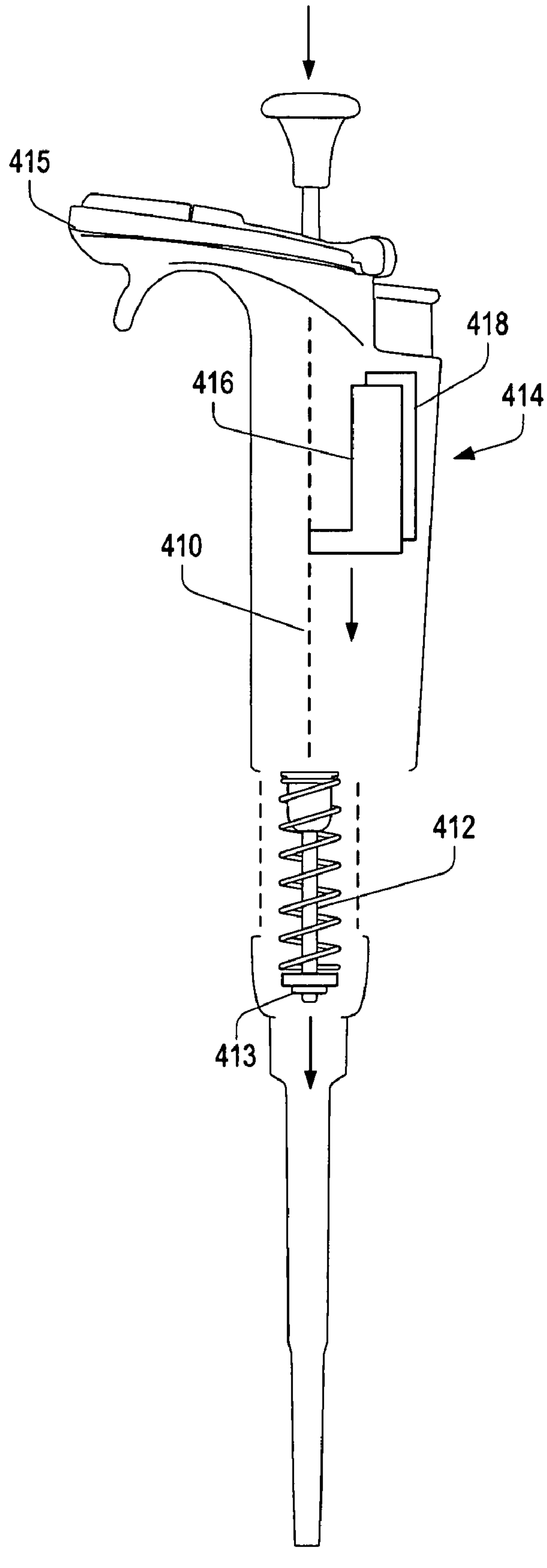
FIG. 4 is a schematic view illustrating a rigid linkage between a plunger assembly and a sensor assembly of the pipette of FIG. 3.

As in traditional "air displacement" pipettes, the plunger button 114 operates a piston configured to displace air within the liquid end 118; movement of air causes a corresponding movement of a liquid, provided an air-tight seal is present between the tip 116 and the liquid being handled, between the tip 116 and the liquid end 118, and between the piston and a seal (as illustrated in FIG. 4 and described below).

The hybrid manual-electronic pipette 110 further includes a tip ejector 120 mounted for longitudinal movement over the liquid end 118 and coupled to a tip ejector button 122. After the tip 116 is mounted to the pipette 110 and used, it can be ejected and disposed of by depressing the ejector button 122; this functionality is again comparable to the functionality of traditional pipettes.

Where the hybrid manual-electronic pipette 110 begins to differ from traditional handheld pipettes, however, is in the presence of a user interface 124 including an electronic display 126 and button panel 128. In the pipette 110 according to the invention, the display 126 and button panel 128 add very little weight to the pipette, are easily operated, and enable improved performance and added functionality to the pipette 110 that are not generally practical with traditional pipettes. These differences will be discussed in further detail below.

Figure 2:
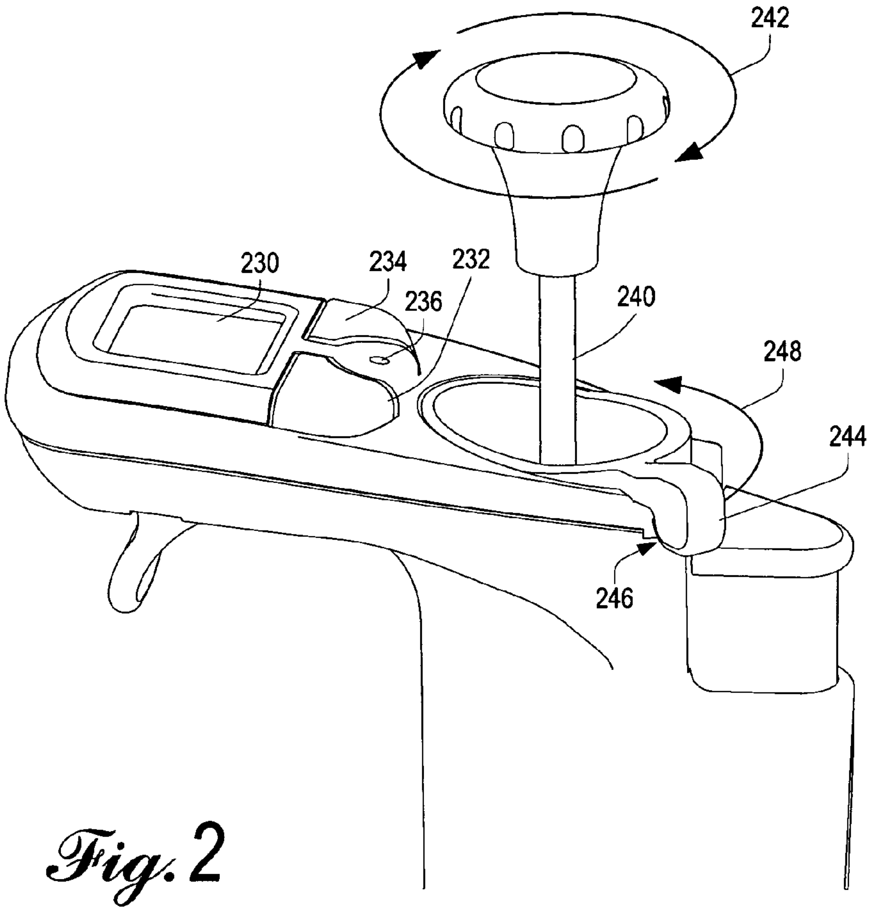
FIG. 2 is an enlarged external view of the hybrid manual-electronic pipette of FIG. 1, illustrating the functionality of a volume-setting mechanism according to the invention.

As shown in FIG. 2, the user interface 124 is designed and configured to be intuitive and easy to use. In the disclosed embodiment, the display 126 is a small LCD 230, and the button panel includes a "MODE" button 232, a "CC" (cycle count) button 234, and a recessed "OPTION" button 236 accessible via a small opening 238. As will be discussed in further detail below, the MODE button 232 is generally used to scroll through pipette operating modes and CC button 234 operates the cycle counter. The recessed OPTION button 236 is generally used to access an options menu, which gives access to advanced features and capabilities of the hybrid manual-electronic pipette 110.

The user interface further includes a piston plunger shaft 240 upon which the plunger button 114 is mounted, which also serves as a volume-setting knob when rotated as indicated by the arrows 242 and a volume set lock lever 244. The volume set lock lever is movable from a left-most unlocked position 246 and a right-most locked position as indicated by an arrow 248. In the left-most unlocked position 246, the plunger button is free to rotate and change the volume of the pipette 110, as in traditional pipettes, while in the right-most locked position (arrow 248) the plunger button is restricted from rotational motion (hence fixing the volume) but still permitted to be pushed by the user's thumb to control the intake and discharge of liquids as desired by the user. The design and operation of the locking apparatus is set forth in U.S. Pat. No. 5,849,248, owned by the assignee of the present invention, which is hereby incorporated by reference as though set forth in full. Mechanisms of this sort are commonly known.

Figure 3:
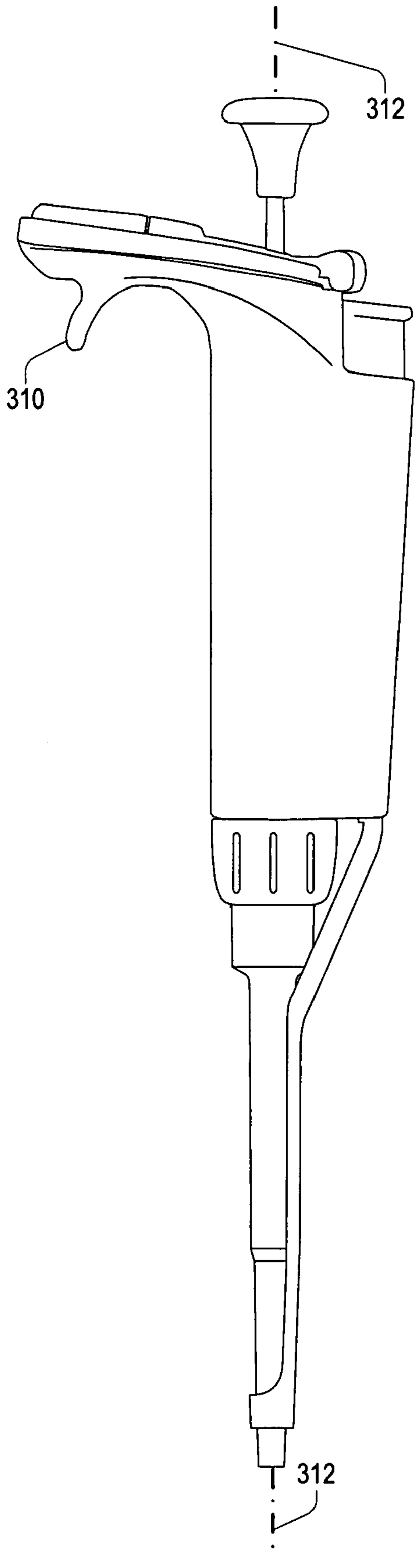
FIG. 3 is a simplified external view of the hybrid manual-electronic pipette of FIG. 1.

As is visible in the simplified drawing of FIG. 3, a finger hook 310 is further provided to allow the user to maintain a light grip on the body 112. The plunger button 114, the plunger button shaft 240, the pipette body 112, and the liquid end 118 are all coaxial with respect to a centerline 312, thereby permitting a single linkage 410 (FIG. 4) between the plunger button and the operative portion of the pipette 110 in the liquid end 118 that operates without substantial slack of backlash. And, because the mass of the pipette 110 is centered around the centerline 312, and the display 126 and button panel 128 above the finger hook 310 contain very little mass, the hybrid manual-electronic pipette 110 according to the invention remains as easy to handle as a traditional pipette.

The linkage 410, as illustrated functionally in FIG. 4, enables the plunger button 114 to act directly through the plunger button shaft 240 to a piston 412, which maintains an air-tight seal with the liquid end 118 via a seal 413. The seal 413 remains in a fixed position with respect to the liquid end 118 and further forms an air-tight seal with respect to an interior portion of the liquid end 118. Accordingly, as the plunger button 114 is manipulated, the piston 412 is caused to move through the seal 413 and displace an air volume within the liquid end. As an orifice 150 (FIG. 1) is provided at a distal end of the tip 116; and a substantially air-tight seal is maintained at all other places, the only path for a liquid (or any fluid) to enter or exit the tip 116 is via the orifice 150, and there is a deterministic relationship between the volume of air displaced by the piston 412 and the volume of liquid manipulated by the pipette 110. As will be discussed in further detail below, this relationship between air displacement and liquid manipulation is generally linear but subject to some correction. Traditional handheld manual pipettes treat the relationship as exactly linear with a correctable zero offset.

The coaxial linkage 410 and connection between the plunger button 114 and the piston 412 enables a position sensing transducer 414 to be connected thereto, allowing the precise and specific position of the plunger button 114 (and hence the tightly coupled piston 412) to be determined at all times. The position sensing transducer 414 is small in size and requires very little battery power to operate. Accordingly, a handheld manual-electronic pipette 110 according to the invention has a comparable feel to traditional manual pipettes, and any battery used to power the position sensing transducer 414 and the display 126 can be quite small. In the disclosed embodiment, a protruding portion 415 of the pipette body 112 (FIG. 1) between the display 126 and the finger hook 310 (FIG. 3) houses a primary (i.e. non-rechargeable) button-cell battery sufficient to power a hybrid manual-electronic pipette 110 according to the invention for at least several months, though it will be recognized that rechargeable batteries and other battery form factors may also be employed, or the pipette 110 may be powered from an external source.

As illustrated, the position sensing transducer 414 includes two components: a sliding component 416 affixed to and moving with the piston plunger shaft 240, and a fixed component 418 affixed to the pipette body 112. Accordingly, then, the position sensing transducer 414 is able to detect and calculate the longitudinal displacement between the sliding component 416 and the fixed component 418. It will be recognized that there are numerous configurations of sensing components that can accomplish this function, including but not limited to a variable resistor (potentiometer), an optical sensor, a capacitive sensor, an inductive sensor, or a magnetic field sensor, some of which are discussed in further detail below. Advantageously, mechanical engagement and friction between the sliding component 416 and the fixed component 418 are minimized, thereby reducing the likelihood of failure over time and repeated use. Moreover, there are similar advantages to keeping the sliding component 416 passive and not directly energized, thereby eliminating the need to provide any electrical connection to the moving part, which might tend to bend, break, or otherwise fail over the course of time.

Figure 5:
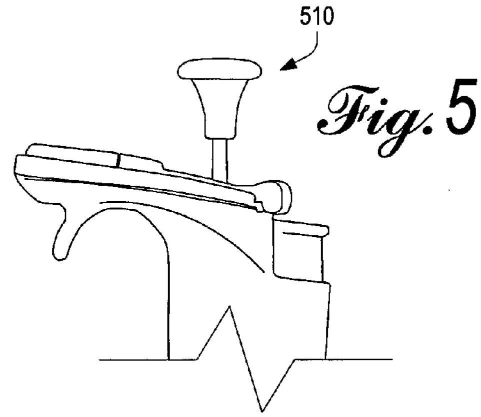
FIG. 5 is a schematic view illustrating a portion of the pipette of FIG. 3 with a plunger assembly in a released position against an upper stop.
Figure 6:
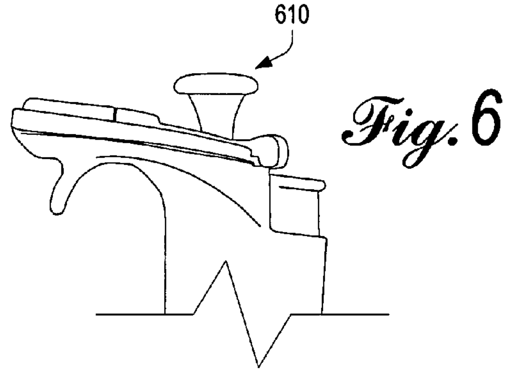
FIG. 6 is a schematic view illustrating a portion of a pipette of FIG. 3 with a plunger assembly in a partially-depressed home position.

As in traditional manual pipettes, the plunger button 114 (FIG. 1) is spring-biased relative to two positions, namely a released and extended position 510 shown in FIG. 5, and a home position 610 shown in FIG. 6. With no pressure applied to the plunger button 114, a plunger spring 420 (FIG. 4) biases the plunger button 114 upward against an upper volume-setting stop, the position of which is adjusted by turning the plunger button 114 and a stop position adjustment mechanism as discussed above. In this position, the piston plunger shaft 240 and plunger button 114 are at the released and extended position 510 with respect to the body 112 of the pipette 110 as graphically illustrated in FIG. 5.

Figure 7:
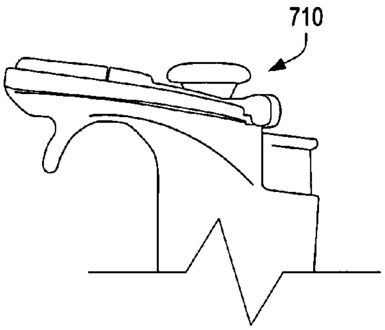
FIG. 7 is a schematic view illustrating a portion of a pipette of FIG. 3 with a plunger assembly in a fully-depressed blowout position.

At the fixed home position 610 illustrated in FIG. 6, with the plunger button 114 partially depressed, the resistance to depression of the plunger button increases. As is common in handheld pipette construction, a secondary blowout spring adds to the resistance offered by the plunger spring 418. The increased resistance is sensed by the pipette user and defines the home position 610. Between the released and extended position 510 and the home position 610, only the plunger spring 420 biases the plunger button position upward toward its extended position 510, and a relatively light first force level is required to act against the spring bias. Between the home position 610 and a fully-depressed blowout position 710 illustrated in FIG. 7, both the plunger spring 420 and the blowout spring act upward against the plunger button 114, and a higher second force level is required to act against the spring bias. This configuration including a primary plunger spring 420 and a secondary blowout spring is common in handheld pipettes.

Accordingly, at the home position 610, the user feels a tactile transition between the two spring forces, and by exerting a force between the first level and the higher second level, the user can easily keep the plunger button at the home position. As will be discussed in further detail below, the ability of the user to identify and maintain the piston 412 at the home position 610 is a requirement for certain desirable pipetting operations, both in a hybrid manual-electronic pipette according to the invention and in traditional manual pipettes.

Figure 8:
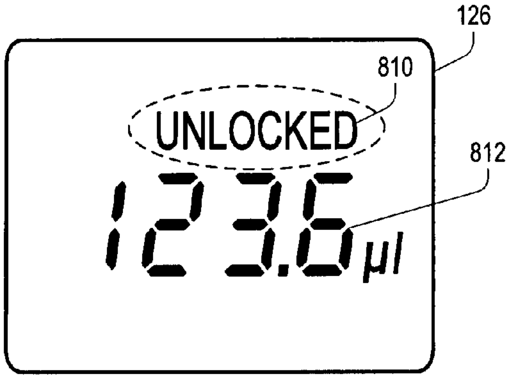
FIG. 8 is a view of a user interface display in a hybrid manual-electronic pipette according to the invention with a volume setting lock in an unlocked condition.
Figure 9:
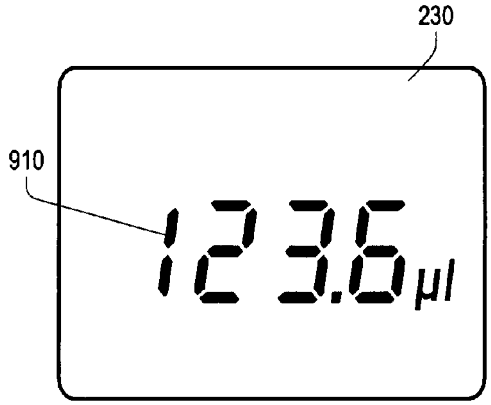
FIG. 9 is a view of a user interface display in a hybrid manual-electronic pipette according to the invention with a capacity set to an exemplary value of 123.6 microliters.
Figure 10:
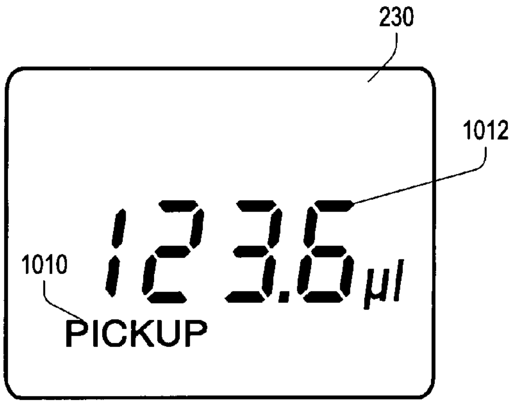
FIG. 10 is a view of the user interface display of FIG. 9, with the pipette configured and prepared to pickup a sample of liquid.

FIGS. 8-10 illustrate the user interface display 126 of a hybrid manual-electronic pipette 110 (FIG. 1) according to the invention when used in a manner similar to traditional handheld manual pipettes, i.e. in a Traditional Mode.

Initially, and as shown in FIG. 8, the user slides the volume set lock lever 244 (FIG. 2) to an unlocked position 246 to allow the pipette 110 to be adjusted. The volume set lock lever 244 is equipped with a lock state switch 2117 (FIG. 21, below) that indicates the state of the lock to a processing unit 2112 (FIG. 21, below) contained in the pipette 110. In an embodiment of the invention, the processing unit comprises a low-power microcontroller capable of running on a small battery for long periods of time, and further capable of operation in a very-low-power "sleep" state while the pipette 110 is not being used. The MSP430 series of ultra-low-power microcontrollers from Texas Instruments Inc. includes integrated circuits that meet these needs, many of which further provide additional digital and mixed-signal system-on-a-chip functionality that can be advantageously employed in a hybrid manual-electronic pipette 110 according to the invention; other vendors also have products that might easily be substituted.

In certain operating modes, while the volume set lock lever 244 is in its unlocked position 246, the LCD 230 displays a flashing "UNLOCKED" indication 810 and the currently set volume of the pipette 812, which in the illustration is 123.6 microliters. By turning the plunger button 114, the user can adjust the position of the upper volume-setting stop as in traditional pipettes. However, because the plunger button 114 is spring-biased to its extended position 510 against the adjusted upper volume-setting stop, the LCD 230 will be updated with the position of the piston 412 as it moves with the stop. In any event, any volume reading obtained while adjusting the volume of the pipette 110 can only be considered accurate if no longitudinal pressure is being applied to the plunger button 114.

When the user locks the volume setting by sliding the volume set lock lever 244 to the locked position 248, a lock state switch 2117 (FIG. 21, below) actuates, causing the "UNLOCKED" indication to disappear from the LCD 230 and as illustrated in FIG. 9 the LCD 230 displays the fixed volume setting 910 regardless of the position of the piston 412. The display 126 is decoupled from the real-time position of the piston 412, allowing the user to determine the capacity of the pipette at a glance, regardless of what stage of pipetting the user is engaged in. Of course, it will be observed that the processing unit still receives measurements of the position of the piston 412; they are simply not being displayed.

When the volume set lock lever is actuated, an accurate and precise measurement is taken of the position of the piston 412 and calibrated by the processing unit as set forth in greater detail below. Because of the tight coupling among the plunger button 114, the sliding component 416 of the position sensing transducer 414, and the air displacement piston 412, and further because of the capability of the position sensing transducer 414 to accurately and precisely read the position of the piston and of the processing unit to adjust that observed position and apply both linear and non-linear compensation, calibration, and adjustment functions as necessary, this volume reading is considered more precise and more accurate than is generally possible using a manual pipette with a mechanical rotary position readout. In particular, the electronic display is not subject to slack or backlash; further advantages will be detailed below.

During a traditional pipetting operation, there are generally two primary actions being performed. First, a sample equal in volume to the setting of the pipette 110 is picked up, and second, that sample is dispensed or otherwise discharged.

When the plunger button 114 is in the home position 610 before picking up a liquid, the processing unit observes the corresponding position of the piston 412, and as shown in FIG. 10 a "PICKUP" notation 1010 is presented on the LCD 230 along with the volume setting 1012. This provides visual confirmation to the user that the piston 412 is in the home position 610 and it is an appropriate time to begin a liquid pickup stroke. It will be noted that numerous other modes of display operation are possible and within the scope of the present invention.

Figure 11:
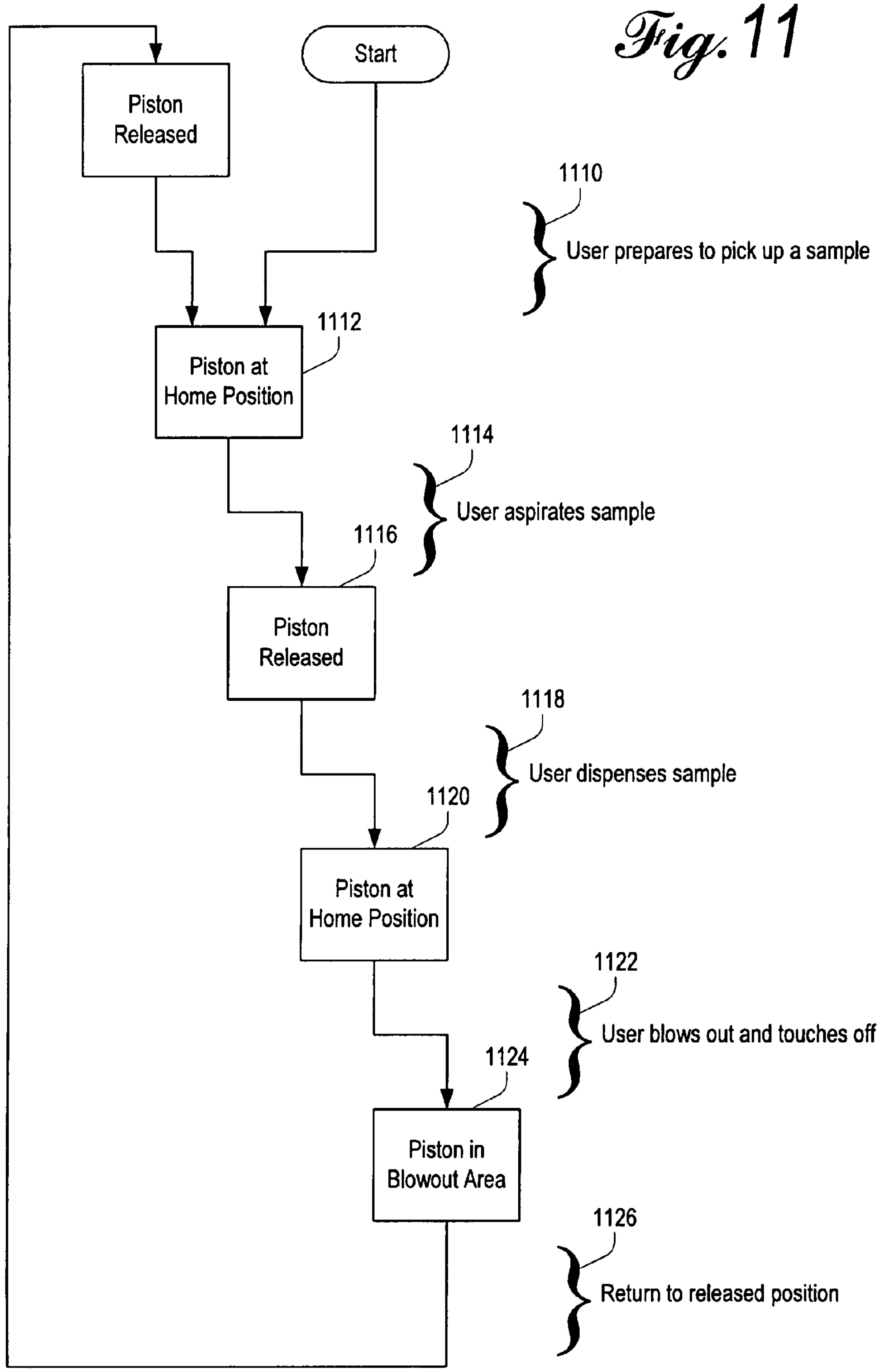
FIG. 11 is a flowchart illustrating an exemplary sequence of steps performed in operating a hybrid manual-electronic pipette according to the invention in a traditional pipetting operation mode.

The primary actions of picking up a sample and dispensing it are performed in the context of a full traditional pipetting cycle, which is illustrated by way of a simple flowchart in FIG. 11.

Initially, the user prepares to pick up a sample (step 1110) by moving the plunger button 114 to the home position 610. The user notes that the display indicates "PICKUP" 1010 (step 1112). After a brief pause, the user inserts the tip 116 into the liquid to be handled and aspirates, or picks up, the sample by gradually releasing (step 1114) the plunger button 114 until it reaches its extended position 510. At the conclusion of the aspiration stroke, with the piston released (step 1116), the pipette 110 contains a quantity of liquid equal to the capacity displayed on the LCD 230, assuming, of course, that the aspiration stroke was performed correctly.

Then the user moves the pipette 110 over a receptacle and dispenses the liquid sample (step 1118) by gradually pushing the plunger button 114 to the home position 610. When the piston 412 is at the home position (step 1120), a dispensing stroke has been performed, but as is well known in the art of pipetting small volumes of liquid, some liquid may be undesirably retained in the tip at this stage. Accordingly, the user pushes the plunger button 114 through the home position 610 to a lower stop, an operation known as "blowing out" the sample, and touches the tip to a surface of the receptacle to remove any last adhering droplet, known as "touching off" (step 1122).

The piston 412 is then in a blowout area (step 1124) below home, with the plunger button 114 fully depressed 710. To perform another stroke, the user releases some pressure (step 1126) on the plunger button 114 to return the piston 412 to the fully extended and released position 510, which requires another return from the extended position to the home position to prepare for another aspiration is performed (step 1110). Alternatively, rather than returning to the released position 510, the user may go back only to the home position 610, in preparation for another immediate aspiration (step 1110).

Recapitulating to some extent, it will be observed that a traditional pipetting cycle generally includes an initial stroke to bring the piston 412 to the home position 610 (if necessary), pre-aspiration pause at a home piston position 610, an aspiration stroke, a pre-dispensing pause at an uppermost piston position, a dispensing stroke, a blowout stroke, and a return stroke (returning to either the home position 610 or the released position 510).

A mode of reverse-pipetting is also possible, in which a cycle generally includes in initial stroke to bring the piston 412 to its lowermost fully-depressed position 710, a pre-aspiration pause at a lowermost piston position 710, an aspiration stroke, a pre-dispensing pause at an uppermost released piston position 510, a dispensing stroke, a post-dispensing pause at a home piston position 610, and a blowout stroke. In this case, the pipette aspirates more than its usual capacity by aspirating during the travel of the piston 412 between the blowout position 710 and the home position 610; the dispense stroke includes only dispensing to the home position 610 and touching off-blowout is discarded. The display mode used for reverse-pipetting is identical to the one used for traditional pipetting It will further be observed that this sequence of steps is frequently performed many times by a pipette user in the course of a workday, and accordingly, it is possible for pipetting errors or inaccuracies to arise while repeating the steps. A hybrid manual-electronic pipette 110 according to the invention has the unique ability to issue alerts to the user of improper pipette operating techniques. Such alerts are possible because of the pipette's firmware in conjunction with its ability to accurately monitor the position of the piston 412 at all times during operation. These technique-monitoring capabilities are generally not possible in traditional pipettes, and will be discussed in further detail below.

Various other advantageous hybrid pipette operating modes are enabled by a hybrid manual-electronic pipette 110 according to the invention.

The traditional pipetting cycle is described above and with reference to FIGS. 8-11. While the electronic readout of volume setting via the LCD 230 certainly improves the accuracy and precision of volume-setting operations, that functionality is generally present (though with reduced accuracy and precision) in manual pipettes. A function not generally possible with manual pipettes is Tracking Mode, in which the position of the piston 412 is tracked and communicated to the user in real time. The Tracking Mode of pipette operation is illustrated in FIGS. 12-14.

Figure 12:
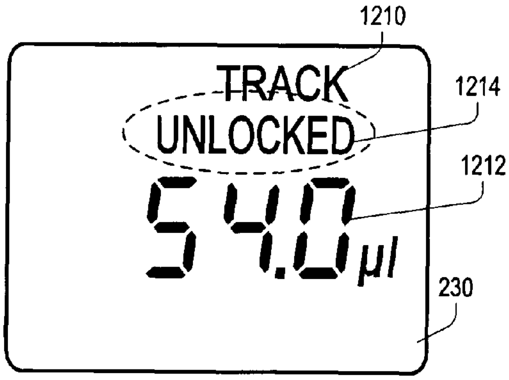
FIG. 12 is a view of a user interface display in a hybrid manual-electronic pipette according to the invention with the pipette in a tracking operating mode and a volume setting lock in an unlocked condition.

Tracking Mode is accessed by depressing the MODE button 232 until the "TRACK" indication 1210 is displayed on the LCD 230, as illustrated in FIG. 12. Tracking Mode shows the position of the piston 412 on the LCD 230 at all relevant times, allowing a user to manually aspirate and dispense as much or as little liquid as desired by maintaining accurate control of the plunger button 114.

In Tracking Mode, with the volume set lock lever 244 is in its unlocked position 246 (FIG. 2), the LCD 230 shows the real-time position of the piston 412 in terms of volume 1212, with zero being at the home position 610 and the maximum capacity of the pipette being at the fully-released position 510 of the plunger button 114. The "UNLOCKED" indication 1214 also flashes.

Figure 13:
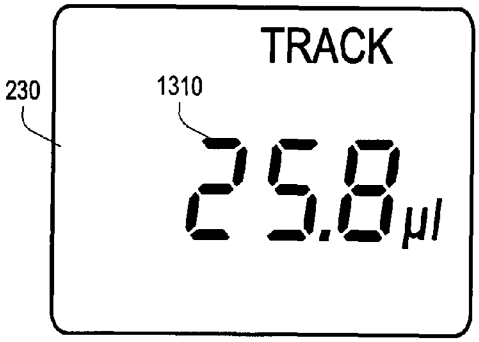
FIG. 13 is a view of the user interface display of FIG. 12 with the pipette piston in a position representing an exemplary value of 25.8 microliters of capacity.
Figure 14:
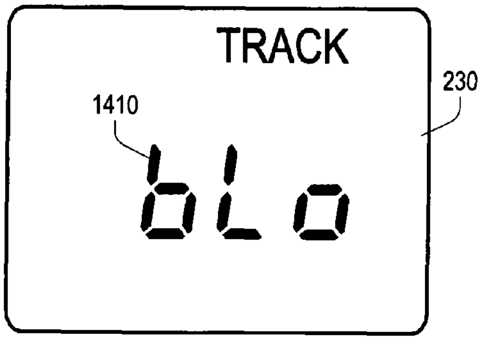
FIG. 14 is a view of the user interface display of FIG. 12 with the pipette piston in a position representing a blowout portion of a dispensing stroke.

As set forth in FIG. 13, with the volume set lock lever 244 in its locked position 248 (FIG. 2), the LCD 230 continues to show the real-time position of the piston 412 in terms of volume 1310. If the user wishes, the volume of liquid in the tip 116 at any time can be determined by reading a value on the display.

It is neither necessary nor useful to provide details of the position of the piston 412 below the home position 610, so when the plunger button 114 is in the fully-depressed blowout area 710, the LCD 230 in Tracking Mode simply reads "bLo" 1410 (for "blowout," or "below zero"), as illustrated in FIG. 14.

To summarize, Tracking Mode defines a pipetting cycle comprising an aspiration stroke and a dispensing stroke. Optionally, there may be a blowout stroke following the dispensing stroke. But in general, Tracking Mode is considered a relatively freeform mode subject to fewer constraints than traditional pipetting mode or reverse-pipetting mode.

Similar to Tracking Mode, a Mixing Mode may be available when the only action necessary is to repeatedly pick up and dispense a quantity of liquid, ensuring that the liquid is sufficiently agitated and mixed. This is even more of a manual mode than Tracking Mode, and although the display may be similar or identical, it may be advantageous to define a separate Mixing Mode to override any restrictions on aspiration and dispense rates, pauses, or other aspects of the mixing operation that are not necessary and might give rise to false technique alarms, as will be discussed in further detail below.

Figure 15:
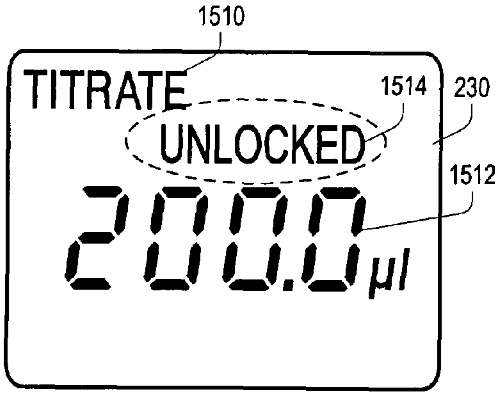
FIG. 15 is a view of a user interface display in a hybrid manual-electronic pipette according to the invention with the pipette in a titration operating mode and a volume setting lock in an unlocked condition.

A Titration Mode also allows the position of the piston 412 to be tracked and communicated to the user in real time, and is illustrated in FIGS. 15-18. Titration Mode is accessed by depressing the MODE button 232 until the "TITRATE" indication 1510 is displayed on the LCD 230, as illustrated in FIG. 15.

Titration Mode is generally used to gradually dispense a quantity of reagent while observing a reaction or looking for a certain characteristic in the vessel into which the liquid is being dispensed. Accordingly, then, Titration Mode advantageously allows the continuous measurement of a quantity of liquid as it is being dispensed.

In Titration Mode, with the volume set lock lever 244 is in its unlocked position 246 (FIG. 2), the LCD 230 shows the real-time position of the piston 412 in terms of volume 1512, with zero being at the home position 610 and the maximum capacity of the pipette being at the fully-released position 510 of the plunger button 114. The "UNLOCKED" indication 1514 also flashes.

Figure 16:
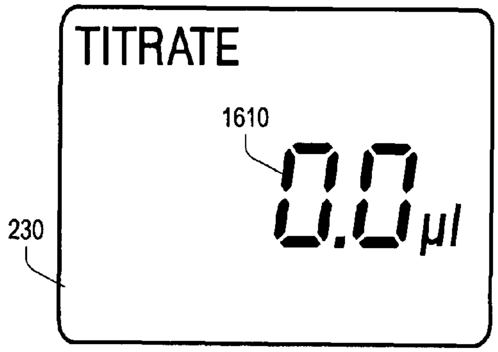
FIG. 16 is a view of the user interface display of FIG. 15 with the pipette having dispensed no fluid.
Figure 17:
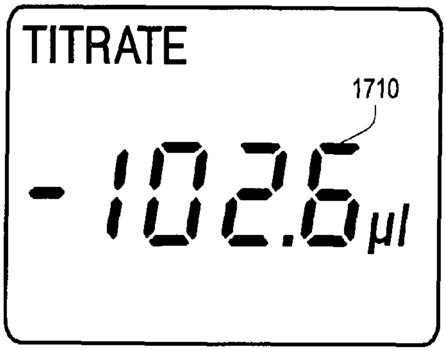
FIG. 17 is a view of the user interface display of FIG. 15 with the pipette having dispensed an exemplary quantity of 102.6 microliters of fluid.

As set forth in FIG. 16, with the volume set lock lever 244 in its locked position 248 (FIG. 2), the LCD 230 continues to show the real-time position of the piston 412 in terms of volume 1610, but with zero set to the fully-released position 510 of the plunger button 114 and values between the released position 510 and the home position 610 expressed as negative volumes.

Accordingly, then, after a full aspiration stroke, the display 126 indicates the quantity of liquid dispensed from the tip 116 as a negative number, starting from zero. While adjusting the volume, the display indicates capacity 1510. At the released position (with the volume locked), the display 126 indicates zero 1610. In the exemplary display of FIG. 17, the user has depressed the plunger button 114 sufficiently to dispense 102.6 microliters 1710 of liquid.

Figure 18:
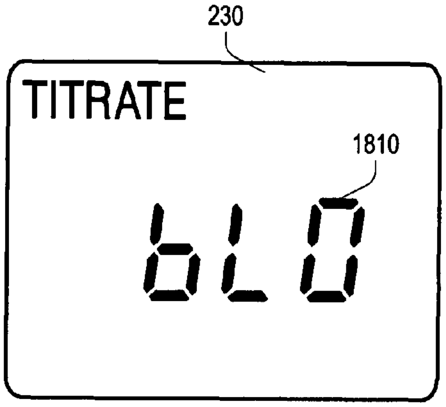
FIG. 18 is a view of the user interface display of FIG. 15 with the pipette piston in a position representing a blowout portion of a titration stroke.

As with Tracking Mode, in Titration Mode it is neither necessary nor useful to provide details of the position of the piston 412 below the home position 610, so when the plunger button 114 is in the fully-depressed blowout area 710, the LCD 230 in Titration Mode simply reads "bLo" 1810 (for "blowout," or "below zero"), as illustrated in FIG. 18.

To recap somewhat, Titration Mode defines a titration pipetting cycle including an initial stroke to home position if necessary, followed by an aspiration stroke, a post-aspiration pause at an uppermost piston position, a gradual titration dispensing stroke, and a blowout stroke to discard excess.

Other additional modes of operation are possible in a hybrid manual-electronic pipette 110 according to the invention.

For example, a Transfer Mode is possible in which a cumulative amount of fluid dispensed over a multitude of dispense operations is possible. In the disclosed embodiment, this mode is accessed by pressing the MODE button 232 repeatedly until a "TRANSFER" indication is shown on the LCD 230. Additive Mode is similar to Titrate Mode, but where more than a single dispense stroke may be necessary to achieve the desired reaction.

In Transfer Mode, with the volume set lock lever 244 is in its unlocked position 246 (FIG. 2), the LCD 230 shows the real-time position of the piston 412 in terms of volume, with zero being at the home position 610 and the maximum capacity of the pipette being at the fully-released position 510 of the plunger button 114. The "UNLOCKED" indication also flashes.

With the volume set lock lever 244 in its locked position 248 (FIG. 2), the LCD 230 continues to show the real-time position of the piston 412 in terms of volume 1610, but with zero set to the fully-released position 510 of the plunger button 114 and values between the released position 510 and the home position 610 expressed as negative volumes.

Accordingly, then, after a full aspiration stroke, the display 126 indicates the quantity of liquid dispensed from the tip 116 as a negative number, starting from zero. While adjusting the volume, the display indicates capacity. At the released position (with the volume locked), the display 126 indicates zero.

As with Tracking Mode and Titration Mode, it is neither necessary nor useful to provide details of the position of the piston 412 below the home position 610, so when the plunger button 114 is in the fully-depressed blowout area 710, the LCD 230 in Dilution Mode simply reads "bLo" (for "blowout," or "below zero").

To recap somewhat, Transfer Mode defines a pipetting cycle including an initial stroke to home position if necessary, followed by an aspiration stroke, a post-aspiration pause at an uppermost piston position, a gradual titration dispensing stroke, and a blowout stroke to discard excess.

After the completion of an initial dispense stroke (and blowout of any retained liquid), another aspiration stroke and gradual titration dispensing stroke may be performed. After this subsequent aspiration, the volume reading on the LCD 230 reflects the total dispensed on previous dispense strokes. For example, if the volume setting is 200 microliters, then before the first dispense stroke the volume reading on the LCD 230 is zero microliters. On the second dispense it is 200 microliters, and on subsequent cycles it is increased by 200 microliters each time. And during the corresponding dispense strokes, the updated volume readings reflect the accumulation from previous strokes.

Another function not generally possible with manual pipettes is Dilution Mode, in which the pipette is used to pick up known volumes of two different liquids and dispense them both in one stroke.

Dilution Mode is accessed by depressing the MODE button 232 until the "DILUTE" indication is displayed on the LCD 230, or alternatively, Tracking Mode may be used for this operation. As with Tracking Mode, Dilution Mode shows the position of the piston 412 on the LCD 230 at all relevant times, allowing a user to manually aspirate and dispense as much or as little liquid as desired by maintaining accurate control of the plunger button 114.

In Tracking Mode, with the volume set lock lever 244 is in its unlocked position 246 (FIG. 2), the LCD 230 shows the real-time position of the piston 412 in terms of volume, with zero being at the home position 610 and the maximum capacity of the pipette being at the fully-released position 510 of the plunger button 114. The "UNLOCKED" indication also flashes.

With the volume set lock lever 244 in its locked position 248 (FIG. 2), the LCD 230 continues to show the real-time position of the piston 412 in terms of volume. If the user wishes, the volume of liquid in the tip 116 at any time can be determined by reading a value on the display.

It is neither necessary nor useful to provide details of the position of the piston 412 below the home position 610, so when the plunger button 114 is in the fully-depressed blowout area 710, the LCD 230 in Tracking Mode simply reads "bLo" (for "blowout," or "below zero").

Generally, a user performs a dilution operation by first performing a stroke to home position, then, while watching the LCD 230, gradually releases the plunger button 114 until a known desired quantity of a diluent has been picked up. Following that, the user removes the tip 116 from the diluent and allows a small air gap to enter the tip 116. Then, while observing the LCD 230, the user will pick up a second known and desired quantity of a sample. The volume of sample will be reflected by the difference in the values shown on the LCD 230 between the beginning of the sample pickup stroke and the end of the sample pickup stroke. Both the diluent and the sample may then be discharged and blown out.

To summarize, Dilution Mode defines a single dilution pipetting cycle comprising an initial stroke to home position if necessary, a pre-aspiration pause at a home piston position, a diluent aspiration stroke, a first aspiration pause, an air gap aspiration stroke, a second aspiration pause, a sample aspiration stroke, a pre-dispensing pause, a dispensing stroke, and a blowout stroke.

In Dilution Mode, the display may be identical to that provided in Tracking Mode, or alternatively, a means for zeroing the display may be provided before the sample is aspirated, to allow the sample aspiration to start from zero and eliminate the mental subtraction step otherwise required.

Multidispense Mode allows a single sample to be distributed to multiple vessels in multiple small aliquots. In the disclosed embodiment, Multidispense Mode is accessed by pressing the MODE button 232 until "MULTI" is shown on the LCD 230, or alternatively, Tracking Mode or Titration Mode may be used to perform this operation as well. As with Tracking Mode, Multidispense Mode shows the position of the piston 412 on the LCD 230 at all relevant times, allowing a user to manually aspirate and dispense as much or as little liquid as desired by maintaining accurate control of the plunger button 114.

In Multidispense Mode, with the volume set lock lever 244 is in its unlocked position 246 (FIG. 2), the LCD 230 shows the real-time position of the piston 412 in terms of volume, with zero being at the home position 610 and the maximum capacity of the pipette being at the fully-released position 510 of the plunger button 114. The "UNLOCKED" indication also flashes.

With the volume set lock lever 244 in its locked position 248 (FIG. 2), the LCD 230 continues to show the real-time position of the piston 412 in terms of volume. If the user wishes, the volume of liquid in the tip 116 at any time can be determined by reading a value on the display.

It is neither necessary nor useful to provide details of the position of the piston 412 below the home position 610, so when the plunger button 114 is in the fully-depressed blowout area 710, the LCD 230 in Tracking Mode simply reads "bLo" (for "blowout," or "below zero").

Generally, a user performs a multidispense operation by first performing a stroke to home position and aspirating a quantity of sample sufficient to cover the desired aliquots plus a small extra amount to ensure accuracy in the last aliquot. Then, while watching the LCD 230, the user gradually depresses the plunger button 114 until a known desired aliquot has been discharged into a first vessel. Following that, the user moves the tip to a second vessel and dispenses a second aliquot, and so forth until all aliquots have been delivered. The volume of each aliquot will be reflected by the difference in the values shown on the LCD 230 between the beginning and the end of each aliquot dispense stroke. After all aliquots have been delivered, any remaining liquid in the pipette 110 may be discharged and blown out.

It should be noted that Multidispense Mode accommodates not only multiple aliquots of the same volume, but also multiple differing aliquots. Generally, the display in Multidispense Mode is the same as in Titration Mode, requiring the user to note the beginning and end measurements for each aliquot dispense stroke, and to perform mental subtraction to be sure each aliquot is correct. However, in an embodiment of the invention, the volume displayed on the LCD 230 may be reset to zero following each aliquot dispense stroke, either manually (e.g. via a display reset button) or automatically, which would facilitate ease of use.

In summary, the Multidispense Mode provided by the pipette 110 defines a multidispense pipetting cycle comprising an initial home stroke if necessary, a pre-aspiration pause at a home piston position, an aspiration stroke, a pre-dispensing pause, a plurality of aliquot dispensing strokes and dispensing pauses, and a blowout stroke.

Another function not generally possible with manual pipettes is Measuring Mode, in which the pipette is used to pick up an unknown quantity of a sample and measure its volume.

Measuring Mode is accessed by depressing the MODE button 232 until the "MEASURE" indication is displayed on the LCD 230, or alternatively, Tracking Mode may be used for this operation. As with Tracking Mode, Measuring Mode shows the position of the piston 412 on the LCD 230 at all relevant times, allowing a user to manually aspirate and dispense as much or as little liquid as desired by maintaining accurate control of the plunger button 114.

In Measuring Mode, with the volume set lock lever 244 is in its unlocked position 246 (FIG. 2), the LCD 230 shows the real-time position of the piston 412 in terms of volume, with zero being at the home position 610 and the maximum capacity of the pipette being at the fully-released position 510 of the plunger button 114. The "UNLOCKED" indication also flashes.

With the volume set lock lever 244 in its locked position 248 (FIG. 2), the LCD 230 continues to show the real-time position of the piston 412 in terms of volume. If the user wishes, the volume of liquid in the tip 116 at any time can be determined by reading a value on the display.

It is neither necessary nor useful to provide details of the position of the piston 412 below the home position 610, so when the plunger button 114 is in the fully-depressed blowout area 710, the LCD 230 in Tracking Mode simply reads "bLo" (for "blowout," or "below zero").

Generally, a user performs a dilution operation by first performing a stroke to home position, then, while watching the LCD 230, gradually releases the plunger button 114 until the desired quantity of a sample has been picked up. Without moving the plunger button 114 further, the user then reads a measurement from the LCD 230 of how much liquid was picked up. The measured liquid may then be discharged as desired.

Recapitulating, a Measuring Mode pipetting cycle includes an initial home stroke if necessary, a pause at a home piston position, a measuring aspiration stroke, a post-measuring pause, and a discharge stroke.

It will be further noted that some or all of the foregoing individual pipetting operations may be combined into a complex sequence of pipetting operations, and a hybrid manual-electronic pipette 110 according to the invention may be programmed to facilitate this.

To provide one exemplary scenario, in a relatively complicated laboratory experiment, it might be necessary to perform the following steps in sequence:

(1) To first transfer a sample from a sample container into a first vessel already containing diluent;

(2) to then mix the sample and diluent in the first vessel; and (3) finally to then multidispense the diluted sample from the first vessel into a rack of tubes.

With a hybrid manual-electronic pipette 110 according to the invention, the processing unit may be programmed to perform these steps in sequence by causing mode switches to occur automatically at the end of each pipetting cycle, or the stages may be delimited manually.

To elaborate upon the example, initially the pipette would be in the traditional pipetting mode, and an indication on the display might instruct the user to set a specific volume, displaying a message when the correct volume is reached. Upon locking the lock lever, the user performs a traditional pipetting operation to transfer the desired quantity from the sample container to the mixing vessel.

When the sample is dispensed into the mixing vessel and blown out, the processing unit notes that the cycle is complete and then switches into Mixing Mode. The user then performs the desired mixing operation in the mixing vessel, and at the conclusion (either indicated by a button press or by the passage of several seconds from the last stroke, for example), the processing unit then automatically switches to Multidispense Mode, requesting the user to make another volume adjustment, and subsequently allowing the user to perform that operation.

To summarize, the Composite Mode defines a sequential plurality of pipetting cycles selected from traditional cycles, reverse cycles, tracking cycles, titration cycles, dilution cycles, mixing cycles, and measuring cycles, and in some of these steps, the pipette may communicate specific instructions or reminders to the user, which will be discussed in additional detail below.

It will be recognized that it is possible that the user may get "out of sync" with the pipette 110 in Composite Mode (or in any of the other foregoing modes). It is contemplated that a pipette 110 according to the invention is able to discriminate between similar strokes (e.g., aspiration strokes vs. return strokes) by observing the starting and ending points, speeds, directions, and if necessary comparable details of preceding strokes, to disambiguate the stroke being performed and apply the correct criteria thereto.

It may be burdensome to provide these relatively complex composite instructions to the pipette 110 via the built-in user interface 124. A data interface between the pipette 110 and external equipment may be used to advantage, which will be discussed in further detail below.

Figure 19:
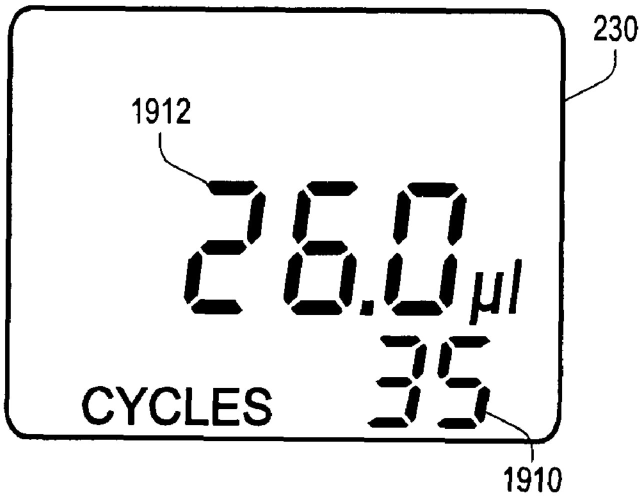
FIG. 19 is a view of a user interface display in a hybrid manual-electronic pipette according to the invention with a cycle counter displayed.

In an embodiment of the invention, the user at any time can observe the number of full pipetting cycles performed. By pressing the CC button 234 (FIG. 2), the number of cycles performed since a reset of the cycle counter or the initial application of power to the pipette 110 is displayed on the LCD 230 as shown in FIG. 19, which by way of example shows 35 cycles 1910 having been performed in the traditional pipetting mode, with the capacity set to 26.0 microliters 1912.

Preferably, a hybrid manual-electronic pipette according to the invention will only count complete pipetting cycles—any incorrectly performed or incomplete cycles will be ignored. In the traditional pipetting mode, for example, a complete cycle comprises: pressing the plunger button 14 to the home position 610, aspirating a sample, dispensing the sample, blowing out the sample (at which point the cycle counter is incremented), and releasing the plunger back to the released position 510. The processing unit and position sensing transducer 414 of a pipette according to the invention enable this functionality, which is not possible with manual pipettes, even those that are capable of incrementing a mechanical cycle counter.

In the disclosed embodiment, the cycle counter uses three digits to read to a maximum of 999 cycles, after which the counter resets to zero. The counter may be manually reset to zero by pressing and holding the CC button 234.

Figure 20:
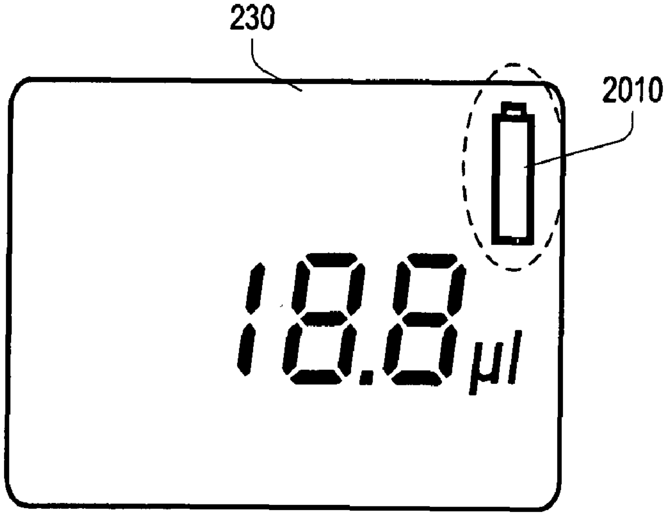
FIG. 20 is a view of a user interface display in a hybrid manual-electronic pipette according to the invention with a low-battery symbol displayed.

As observed above, a hybrid manual-electronic pipette 110 according to the invention includes an LCD 230, a position sensing transducer 414, and a low-power processing unit, all of which may be powered by a battery. From time to time the battery will require replacement, and as illustrated in FIG. 20, the LCD may include a low-battery indicator 2010 which may flash for some time period before battery replacement is required. Generally, button-cell batteries such as those used in the disclosed embodiment of the invention have well-known discharge profiles, and it is relatively simple matter to determine an anticipated discharge from voltage measurements over time.

Figure 21:
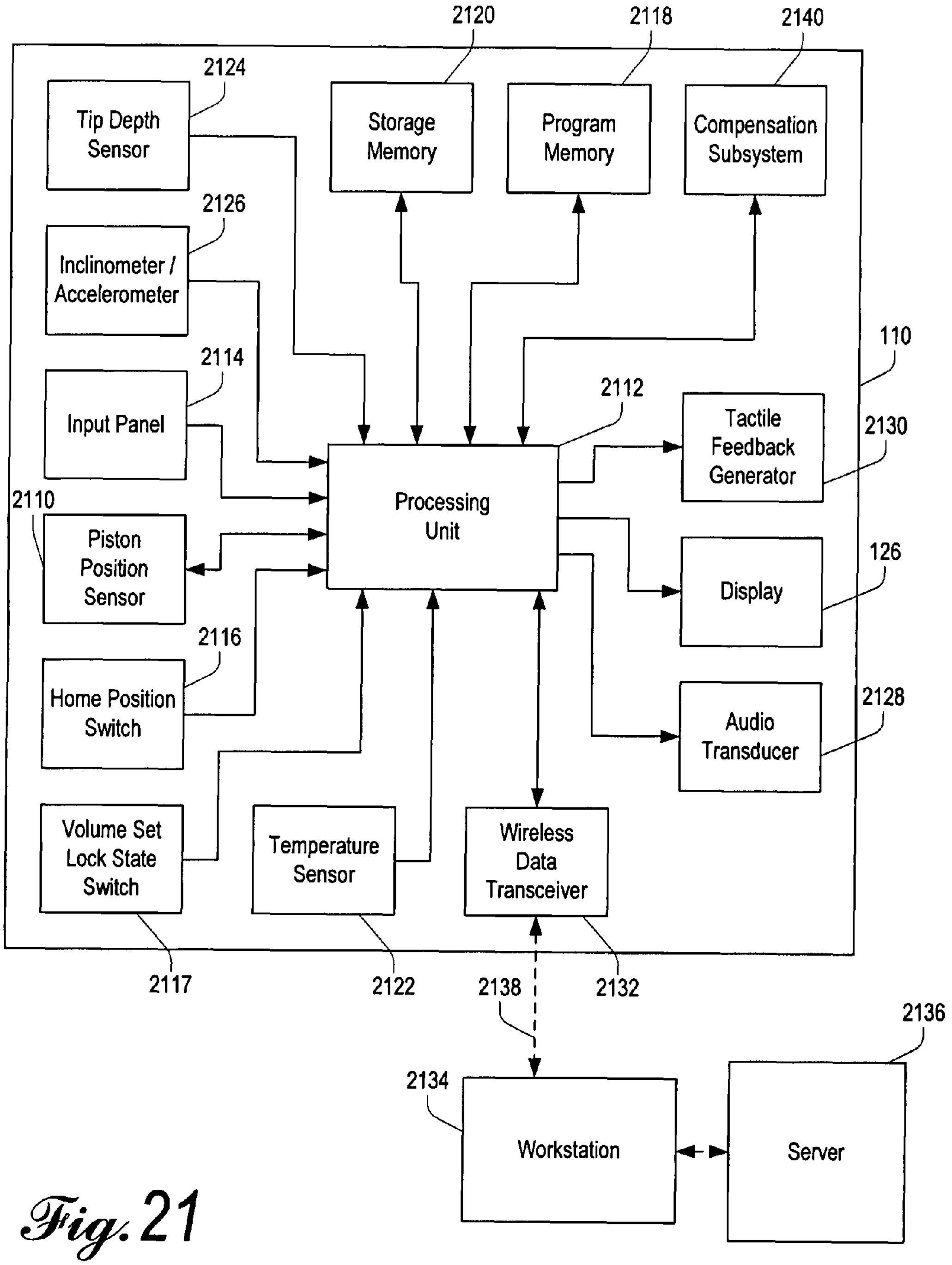
FIG. 21 is a block diagram illustrating the major functional subsystems of a hybrid manual-electronic pipette according to an embodiment of the invention.

FIG. 21 is a basic block diagram of an embodiment of the disclosed hybrid manual-electronic pipette 110.

As already discussed, the pipette 110 includes a piston position sensing transducer 414, illustrated in FIG. 21 as the piston position sensor 2110. It also includes a processing unit 2112, which as described above is preferably a low-power microcontroller with flexible input/output capabilities. With a mixed-signal system-on-a-chip microcontroller as the processing unit 2112, interfaces to the various other subsystems described herein (including the piston position sensor 2110) may be either analog or digital in nature.

The pipette 110 also includes an input panel 2114 (i.e., the button panel 128) and the display 126, generally taking the form of the LCD 230. A home position switch 2116 is provided to indicate when the piston 412 is in the home position 610, or within a very small positional tolerance thereof. A lock state switch 2117 is coupled to the volume set lock lever 244, as described above with reference to FIG. 8, and allows the processing unit 2112 to determine whether the volume setting mechanism of the pipette 110 is locked or unlocked. As is traditional with microcontroller-based devices, sufficient program memory 2118 and data storage memory 2120 are also provided, and the entire electronic portion of the pipette 110 is powered by a battery as previously discussed.

The power consumption of a pipette 110 according to the invention can be considerably mitigated by employing a "sleep mode." For example, if substantially no piston movement is detected by the piston position sensor 2110 over three minutes, the pipette may switch to a very-low-power mode and await a wakeup event, such as a processing unit interrupt triggered by the home position switch 2116. In this way, a user can "wake up" the pipette simply by partially depressing the plunger button 114.

In addition, several other components may be advantageous to include in a hybrid manual-electronic pipette 110 according to the invention. For example, a temperature sensor 2122 would enable the processing unit 2112 to compensate for liquid characteristics (viscosity, density, etc.) based on environmental temperature. A tip depth sensor 2124 (for example, an ultrasonic transducer coupled to the liquid end 118) might provide advantageous information relating to the depth of the tip when a sample is being aspirated. Too shallow, and air may be inadvertently admitted; too deep, and pressure may force additional liquid into the tip.

An inclinometer or accelerometer 2126 may be used to ensure the pipette user is following good technique, by keeping the pipette 110 substantially upright at all stages of a pipetting operation, without abrupt movements or "jerks" that might influence the liquid in the pipette tip 116 or cause contamination in the liquid end 18. Exemplary inclinometers and accelerometers might include mercury switches to determine orientation, and electromagnetic flux disturbance or MEMS devices to determine acceleration.

Actions to be taken in response to poor pipetting technique are discussed below.

For communicating to the user, in addition to the display 126, the pipette 110 may be provided with an audio transducer 2128 or a tactile feedback generator 2130. The audio transducer 2128 may "beep" to advise the user that a certain action needs to be taken or that a problem was observed with a preceding pipetting stroke or cycle. In noisy production or laboratory environments, the "beep" may be replaced by a simple vibratory alert provided by the tactile feedback generator 2130, as is commonly known from mobile telephones, or a brightly flashing LED may be provided for a visual alert.

In an embodiment of the invention, the pipette 110 further includes a wireless data transceiver 2132 adapted to send and receive information from external devices, such as a workstation 2134 or a server 2136, either of which may be connected to the pipette 110 via a wider network such as the Internet or a corporate intranet. A data link 2138 facilitated by the transceiver 2132 would allow the pipette 110 to send stroke or cycle data, or simply only error data, to the external device for storage, analysis, or auditing. Such data may be transmitted in real time as cycles and strokes are performed, or may be stored locally in the storage memory 2120 of the pipette 110 and downloaded to the workstation 2134 at a later time.

This data link 2138 would also permit a user of the workstation 2134 to design a complex program or protocol of pipetting cycles to be performed in a particular sequence, and to upload that program to the pipette 110, as described above.

It will be recognized that the data link 2138 may be realized in numerous ways, including via the Bluetooth, Zigbee, or MICS communications standards; other approaches are also possible. Alternatively, a wired link such as an RS-232 serial connection or a USB connection may be provided where a wireless link is impractical (e.g., in environments where a great deal of electromagnetic noise is present). USB has the further advantage of also being able to supply power to the pipette 110.

A compensation subsystem 2140 is present in the pipette 110, allowing raw measurements taken from the piston position sensor 2110 to be processed, adjusted, and compensated as necessary to achieve accurate and precise liquid volume measurements that are presented to the user via the display 126 and optionally stored in the storage memory 2120 or transmitted to external equipment 2134. The operation of the compensation subsystem 2140 will be discussed in further detail below.

Figure 22:
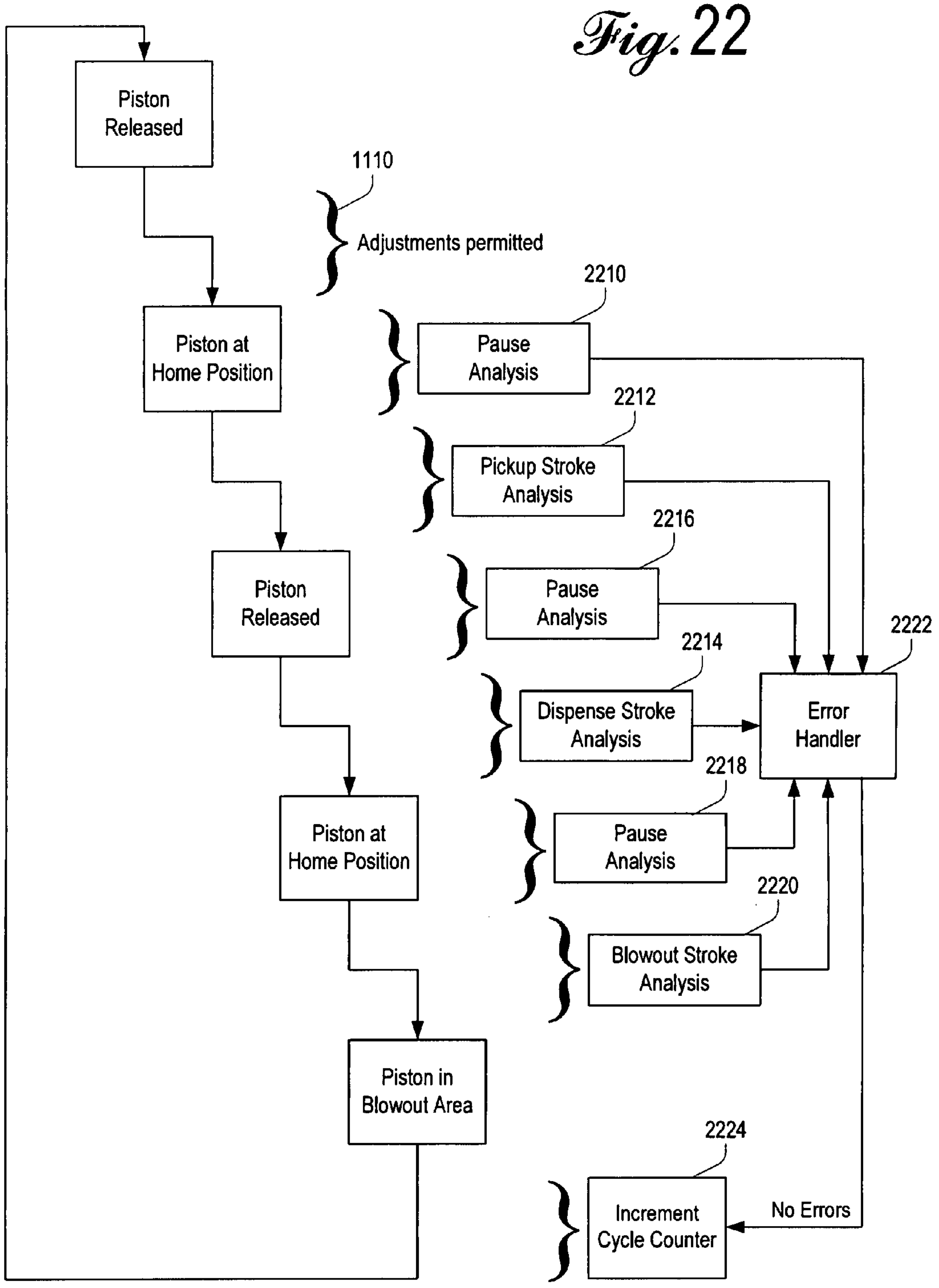
FIG. 22 is a flow diagram illustrating the steps performed in the traditional pipetting operation mode of FIG. 11 combined with steps of a technique analysis function in a hybrid manual-electronic pipette according to the invention.

Turning now to FIG. 22, the technique analysis capabilities of a pipette 110 according to the invention are illustrated with the same sequence of steps shown in FIG. 11, which documents a traditional pipetting cycle.

In the traditional pipetting stroke, before and during the initial move to home position (step 1110), adjustments may be made to the pipette volume, which will result in movement of the piston 412. Accordingly, these movements are not analyzed for errors.

Subsequently, there is a pause at home position 610, followed by a pickup stroke, followed by a pause at released position 510, followed by a dispense stroke, followed by a pause (if any) at the home position, followed by a blowout stroke.

It has been noted that pipetting technique is most important during the initial pause at home position, the pickup stroke, and the dispense stroke. Consequently, in the disclosed embodiment, at least a pause analysis 2210 is performed of that initial pause at home position, a pickup stroke analysis 2212 is performed, and a dispense stroke analysis 2214 is performed. Optionally, further pause analyses 2216 and 2218 may be performed following the aspiration stroke and the discharge stroke, and blowout stroke analysis 2220 is performed.

The home position pause analysis 2210 checks to ensure that the home position is held stable, in the disclosed embodiment, for at least 0.5 seconds. If the pause is shorter, the processing unit 2112 may flag a pipetting technique violation. If the pause is shorter still, e.g. less than 0.35 seconds, the processing unit 2112 may declare an incomplete pipetting cycle in addition to the technique violation.

Similarly, aspirating a sample should be performed at a controlled rate and should start at the home position 610. The aspiration starting point and the aspiration rate are calculated and checked in the pickup stroke analysis 2212. If, for example, the aspiration rate (calculated from a plurality of position samples over time) exceeds a threshold, or if the aspiration stroke begins somewhere other than the home position 610, the processing unit 2112 may flag a pipetting technique violation. This threshold may depend on the capacity of the pipette and the nature of the fluid being pipetted.

Generally, a dispensing stroke has fewer limitations, but it should be checked for completeness by the dispense stroke analysis 2214. If the stroke is not completed, or it does not start at the released position 510, the processing unit 2112 may declare an incomplete pipetting cycle and flag a technique violation.

In an analogous manner, the pause analysis 2216 performed after aspiration should be at least (for example) 1.4 seconds to avoid a pipetting technique violation, or 0.8 seconds to avoid an incomplete cycle declaration. And in an embodiment, at least 0.2 seconds should be spent in the blowout position to avoid a technique violation.

If any technique violations occur, an error handler 2222 causes an action to be performed. A record of a violation may be stored (as a data record with or without corresponding stroke data) in the storage memory 2120, or transmitted to the workstation 2134. An alert (e.g. a "beep" or vibration alert, or an indication on the display 126) may be provided to the user. When a violation is stored or transmitted, the data record may include a timestamp, raw stroke data, raw cycle data, cycle count, or any measurements from the components of FIG. 21 that might be relevant to the violation. Various combinations are possible and considered to be within the scope of the present invention.

If the pipette 110 has not declared an incomplete cycle, the cycle counter is incremented 2224 (in some cases, as discussed above, even when a technique violation has been flagged).

Figure 23:
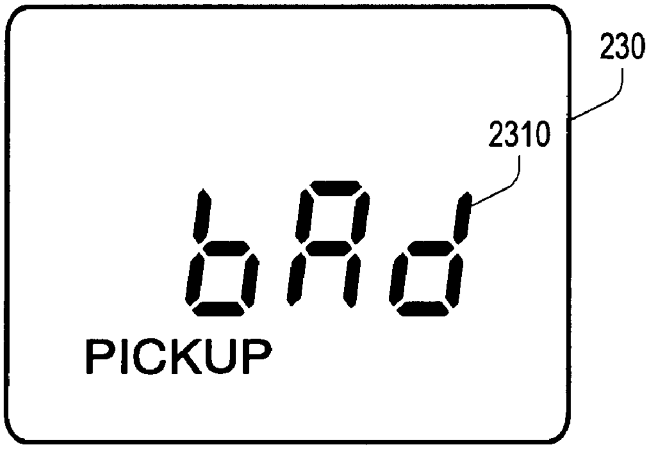
FIG. 23 is a view of a user interface display in a hybrid manual-electronic pipette according to the invention with a display alerting the user to a bad pickup operation identified by a technique analysis function according to the invention.
Figure 24:
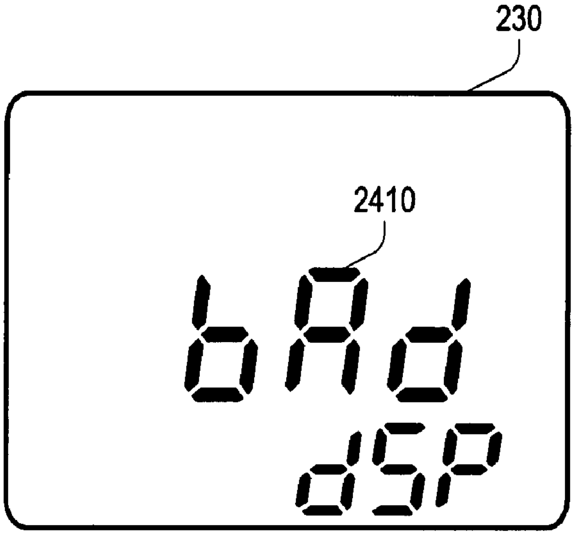
FIG. 24 is a view of a user interface display in a hybrid manual-electronic pipette according to the invention with a display alerting the user to a bad dispense operation identified by a technique analysis function according to the invention.

FIGS. 23 and 24 provide exemplary displays on the pipette 110 that may be provided when a violation has been flagged. In FIG. 23, if the home position pause analysis 2210 or the pickup stroke analysis 2212 flags a violation, the LCD 230 may present the message "bAd PICKUP" 2310. Similarly, in FIG. 24, if the dispense stroke analysis 2214, the post-aspiration pause analysis 2216 or the blowout stroke analysis 2220 flags a violation, the LCD 230 may present the message "bAd dSP" 2410 to indicate a problem with the dispensing operation. Other messages, including alternative visual alerts (such as a flashing LED), audio alerts, and tactile alerts are also possible.

It may be desirable, in some circumstances, to use the hybrid manual-electronic pipette 110 without the technique analysis capabilities in effect—this is particularly true when non-traditional pipetting techniques and procedures are being used, and many operations would otherwise be flagged as violations. Accordingly, it is possible to disable the technique analysis by pressing the recessed OPTION button 236 and navigating using the MODE button 232 to reach a display indicating the state of the technique alert. As shown in FIG. 25, when the alert is disabled, the LCD 230 reads "ALEr OFF" 2510, and as shown in FIG. 26, when the alert is enabled, the LCD 230 reads "ALEr On" 2610. In the disclosed embodiment, the user may toggle between the two settings by pressing the CC button 234.

In the disclosed embodiment, the criteria employed to determine whether a technique violation has occurred and whether a cycle should be counted comprise a plurality of pre-programmed floor (minimum) and ceiling (maximum) criterion values for stroke start positions, end positions, maximum speeds, and pause durations. However, it is also possible to enable user-set criteria, and in an embodiment of the invention, these criteria are set by initiating a Learn Mode.

In the Learn Mode, the user performs an exemplary pipetting cycle and repeats it several times, preferably at least three times. Based on these exemplary cycles (and building in reasonable tolerances), the processing unit 2112 calculates representative maxima and minima values that will be used for subsequent technique analysis. An expert in performing a particular pipetting operation may perform the exemplary pipetting cycles in Learn Mode, and then give the pipette to a less-experienced user. If the less-experienced user's pipetting varies from the expert's example by more than the tolerances, technique violations will be flagged as set forth above. Accordingly, this function of a pipette 110 according to the invention can be a valuable educational tool, and over a long term can improve quality control.

By using the OPTION button 236 followed by the MODE button 232 to navigate, a Good Laboratory Practices ("GLP") counter may be enabled, which counts days between scheduled pipette services. In the disclosed embodiment, four separate modes are possible: GLP1 (one year between services), GLP2 (six months between services), GLP3 (four months between services), GLP4 (three months between services). In FIG. 27, the LCD 230 indicates that GLP4 2710 is in effect, with three months between scheduled services. The number "37" 2712 indicates that there are thirty-seven days left until the service interval expires.

As the number of days approaches zero, the pipette 110 may provide warnings to the user when turned on or coming out of sleep mode. If there are fewer than thirty days remaining, the display 230 will show a "CAL dUE" message 3710 (FIG. 37), followed by the number of days, e.g. the "14 dAy" message 3810 of FIG. 38. Of course, the GLP counter mode of the pipette 110 may also be disabled entirely.

Other timers and counters may also be used, including a GLP counter based on cycles, or an ergonomic counter based on either cycles or elapsed time. An ergonomic counter according to the invention would enable providing alerts to the user suggesting that regular breaks be taken, as repetitive stress injuries may result from extended pipetting sessions using any handheld pipette.

As shown in FIG. 28, a total cycle count since manufacture may be accessed via the OPTION button 236, followed by multiple presses of the MODE button 232. In the illustration, 12,345 cycles 2810 have been performed.

The compensation subsystem 2140 in a hybrid manual-electronic pipette 110 according to the invention performs several important measurement compensation steps, either individually or in combination.

As will be discussed in further detail below, raw measurement signals from the piston position sensor 2110 are not immediately representative of liquid volumes handled by the pipette 110. Such signals require compensation and conversion. These operations are performed by the compensation subsystem 2140, which in the disclosed embodiment comprises firmware routines performed by the processing unit 2112 using at least one compensation function. As the term is used herein, a "compensation function" may include one or more of a zero offset adjustment, a scale factor, a look-up table, or a mathematical transfer function.

Generally, when hybrid pipettes according to the invention are manufactured, there are at least two sources of inaccuracy in measurement. First, signals from the piston position sensor 2110 may not be linear. Second, even after linearization of the piston position, the conversion to liquid volume is somewhat non-linear.

Sensor non-linearity is often a function of manufacturing variances, and accordingly, in a disclosed embodiment of the invention, a sensor position compensation function (e.g., in the disclosed embodiment, a sensor linearization table) is generated on a pipette-specific basis. As each pipette comes out of manufacturing, it is placed on a calibration fixture that runs the piston 412 through its entire range of motion and identifies any differences between the measurement observed by the piston position sensor 2110 of the pipette 110 and the known measurement of the calibration fixture. Any deviations are used to create a look-up table, so that given a measurement from the position sensor 2110 (and extrinsic information as necessary), the correct linear displacement can be calculated via a simple look-up translation.

Liquid volume corrections are further necessary and borne out of liquid characteristics such as density, volume, surface tension, viscosity, tip geometry, and tip material. Assuming distilled water at room temperature as the ideal liquid, and the use of a standard tip in a standard configuration, any liquid volume corrections generally do not change with respect to manufacturing variances, but rather are dependent on the known characteristics of a specific model of the pipette liquid end 118. Accordingly, a volume compensation function (e.g., in the disclosed embodiment, a liquid value correction table) is generated off-line by a sequence of balance measurements of pipetted liquid, and once this function is established, it can apply to all pipettes using the same liquid end configuration.

Following linearization of the piston position, these corrections are also applied by a simple table look-up translation.

Other corrections and adjustments are, of course, possible, and it will be noted that other methods (such as curve-fitting mathematical functions to the data and applying those functions as a transfer functions, or in the simplest example, using only offsets and scale factors) would also achieve comparable results. Moreover, it is possible to combine the sensor linearization table and the liquid volume compensation table into a single table or function, so that only one translation needs to be applied; this is deemed equivalent to the described embodiment. Similarly, implementing the calibration subsystem 2140 outside of the processing unit 2112, or by other methods, is also achievable by engineers of ordinary skill, so the disclosed embodiment is deemed merely representative.

Figure 32:
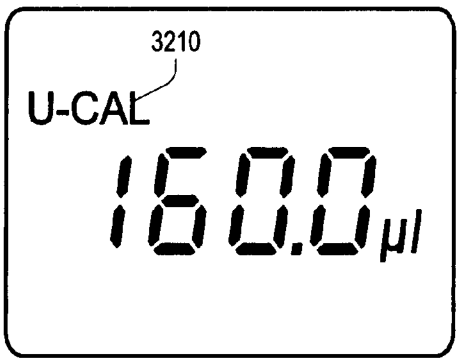
FIG. 32 is a view of a user interface display in a hybrid manual-electronic pipette according to the invention with a display indicating that user-calibration data is present and active.

A user-calibration option allows a user to toggle a user-calibration function between the factory default calibration setting used by the compensation subsystem described above and a custom user calibration setting (i.e., turning the user calibration constants on and off, provided user calibration data exists.) As illustrated in FIG. 32, when the user-calibration function is enabled, the "U-CAL" symbol 3210 will be displayed on the display 126 at all times during operation of the hybrid manual-electronic pipette 110 (FIG. 1). User-calibration data will be applied after the foregoing sensor linearization and liquid volume corrections have been applied.

Figure 29:
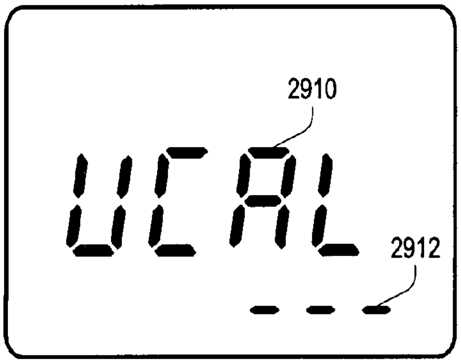
FIG. 29 is a view of a user interface display in a hybrid manual-electronic pipette according to the invention with a display indicating that no user-calibration data is present.

Referring now to FIG. 29, user-calibration settings are accessed once again by depressing the OPTION button 236 followed by multiple presses of the MODE button 232 until "UCAL" 2910 appears in the display. If there is no user calibration data in the user-calibration table of the compensation subsystem (which is the factory default for a new pipette) "UCAL" 2910 will be displayed in the volume digits, followed by "- - -" 2912, the U-CAL symbol 3310 (FIG. 33) will not be displayed, and the CC button 234, which is ordinarily used to toggle user-calibration on and off, will have no action since there is no user calibration data present. If user-calibration data is present, "UCAL ON" or "UCAL OFF" will be displayed, and the CC button 234 will toggle between the two.

Figure 30:
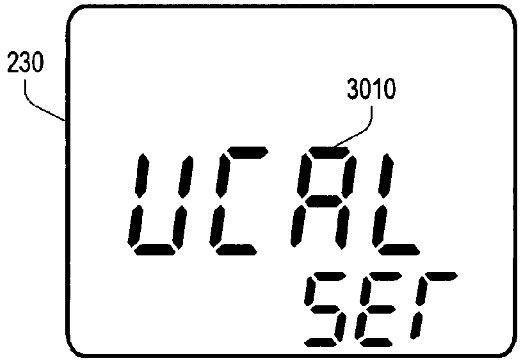
FIG. 30 is a view of a user interface display in a hybrid manual-electronic pipette according to the invention with a display indicating that a user-calibration setting mode has been entered.
Figure 33:
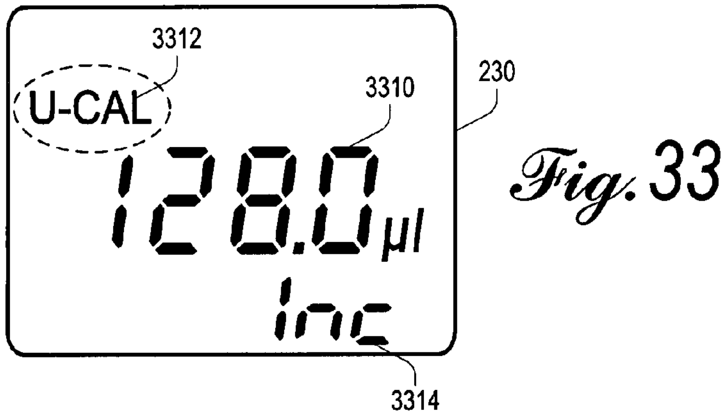
FIG. 33 is a view of a user interface display in a hybrid manual-electronic pipette according to the invention with a display indicating that user-calibration data at a setpoint of 128.0 microliters is being incremented.
Figure 34:
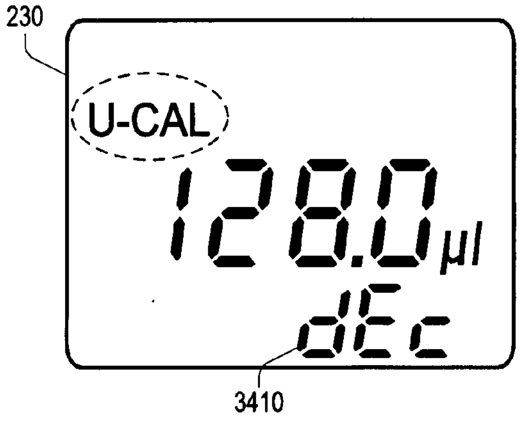
FIG. 34 is a view of a user interface display in a hybrid manual-electronic pipette according to the invention with a display indicating that user-calibration data at a setpoint of 128.0 microliters is being decremented.

Pressing the MODE button 232 will advance the display to the user-calibration setting option. As shown in FIG. 30, when this option is being used, the LCD 230 reads "UCAL SET" 3010. If the user wishes to enter calibration data for the current volume setting of the pipette he simply presses the CC button 234 while the UCAL OPTION option window is displayed; pressing the CC key 234 will cause the display to show the current volume setting 3310 (not flashing) along with a flashing U-CAL symbol 3312, as illustrated in FIG. 33. The CC digits will then display either "Inc" 3314 or "dEc" 3410 (FIG. 34), which indicates the direction that the MODE button 232 will change (correct) the displayed volume. The direction can be toggled to the opposite direction by pressing the CC button 234. By using both the MODE button 232 and the CC button 234, user can change the displayed volume so that it displays the actual volume dispensed at the current setting. When the displayed volume is changed to anything other than its original setting (before the user-calibration data entry mode is selected) it is also flashed along with the U-CAL symbol 3312, which indicates to the user that it has been modified but not entered yet. When the user has the correct volume displayed he can enter it into the user-calibration table by pressing the recessed OPTION button 236.

Figure 35:
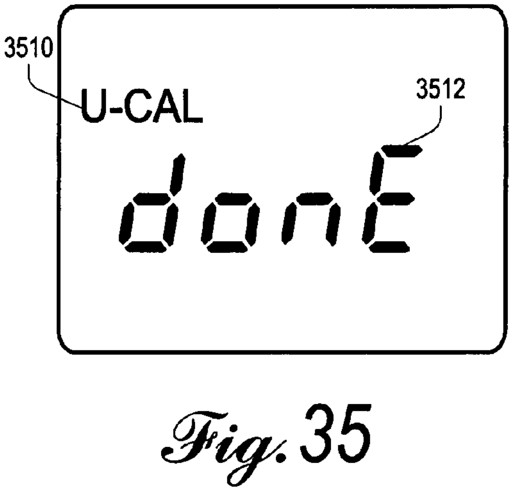
FIG. 35 is a view of a user interface display in a hybrid manual-electronic pipette according to the invention with a display indicating that entry of a user-calibration adjustment has been completed.

By correctly following the above procedure the pipette will then confirm that the user-calibration entry was successful by displaying the U-CAL symbol 3510 and "donE" 3512 in the volume digits (FIG. 35) briefly before it automatically goes back to the previous display mode with the user-calibration feature turned on, indicated by the U-CAL symbol being displayed. Additional user-calibration data points can then be entered by repeating the steps above—first adjusting the pipette to the desired volume, then incrementing or decrementing the displayed value, then pressing the OPTION button 236 to store it. If the plunger is moved during any of the incrementing or decrementing steps outlined above before the final press of the OPTION button 236, the user-calibration data entry is immediately aborted and the pipette returns to normal operation. The attempted calibration entry will be ignored and an error message will be displayed on the LCD 230.

The shaft lock must be in the locked position during the entire user-calibration setting procedure. If the shaft lock is in the unlocked position when user-calibration setting is activated with a CC button 234 press, or if it is unlocked later during the procedure, an error message is displayed and the pipette will not permit the calibration to be performed.

Figure 31:
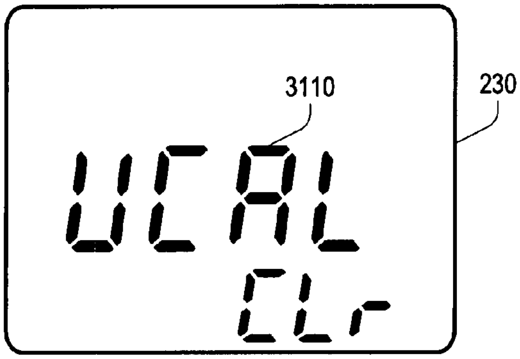
FIG. 31 is a view of a user interface display in a hybrid manual-electronic pipette according to the invention with a display indicating that a user-calibration clearing mode has been entered.

A user-calibration clear function is available and is accessed by pressing the OPTION button 236, followed by the MODE button 232 until, as shown in FIG. 31, "UCAL CLr" 3110 is displayed on the LCD 230. This function is only available if user-calibration data was previously created; actuating it will delete all the user-entered calibration points, and restart calibration over from factory-default values.

To clear a user-calibration table using the user-calibration clear function, the user must first press the CC button 234 to select the clear function. The display then shows the U-CAL symbol, "CLr", and a flashing "no". The user then must press the CC button 234 again to confirm the operation, at which point "YES" will appear, and hold the CC button 234 for a few seconds longer to perform the clear operation. The LCD 230 will momentarily display the U-CAL symbol along with "CLrd" before returning to normal pipette operation with the U-CAL symbol off, confirming the successful clearing of the user-calibration table. The default factory calibration constants will not be affected by this action.

If the above procedure is not followed properly the user-calibration clear function will be aborted without the table being cleared. The clear function is purposely made to be a little more complex than necessary to help prevent an accidental clearing by a user just exploring the user interface or making an inadvertent button selection. An aborted user-calibration clear function can easily be detected by a failure to see the confirmation message in the LCD 230, or by noticing that the U-CAL on/off window is still active, or that the U-CAL CLr option is still listed in the menu.

Using only one user-calibration volume setting to calibrate the pipette simply adds a single offset to the factory default calibration constants. A user can add additional points (volume settings) to get a better calibration over the full range of the pipette.

In the disclosed embodiment, more than one calibration volume setting will automatically use a straight-line connection between calibration volumes for correction values to volumes between the calibration points. Each point is added in a manner similar to the first point described above. The full-scale range of a pipette is divided into 50, 64, 75, or 80 equal segments, depending on the range of the pipette, for calibration purposes. Each of these segments has a unique correction constant that is calculated via linear interpolation from the user calibration volumes, though other interpolation schemes are certainly possible. Therefore, a user can theoretically add up to 50, or more, separate calibration points to the custom user calibration table if he desires. Above and below the user-set anchor points, constant offsets are used reflecting the offsets present at the uppermost point and the lowermost point.

In an embodiment of the invention, a second user calibration point would cause the pipette to use a straight-line correction over its entire range, provided that the two calibration volumes are separated enough; that is, a calibration slope as well as an offset would be applied in addition to the factory default constants. If only one calibration volume was measured a user could force it to be a slope correction, rather than just an offset correction, by setting the pipette volume to its lowest value and performing a second calibration entry with zero, or very small, correction made to the volume reading. This second entry would not require an actual measurement.

FIG. 36 illustrates one possible user-calibration scenario in a 200 microliter pipette according to the invention. As shown, four anchor points are entered:

(1) At 75 microliters, a first adjustment point 3610 is added so the pipette display will read 65 microliters;

(2) At 100 microliters, a second adjustment point 3612 is added so the pipette display will read 120 microliters;

(3) At 50 microliters, a third adjustment point 3614 is set at the default value, so 50 microliters is read on the display; and (4) At 150 microliters, a fourth adjustment point 3616 is set at the default value, so 150 microliters is read on the display.

Accordingly, then, five segments are calculated using the four points. From zero to the first point 3610 at 50 measured microliters, the original calibration is used, because the defaults are present at both zero and 50 microliters. Between 50 and the second point 3612 at 75 measured microliters, adjusted values are used to fit a line segment between a reading of 50 microliters at 50 measured microliters, and a reading of 65 microliters at 75 measured microliters. Similarly, between 75 and the third point 3614 at 100 measured microliters, adjusted values are used to fit a line segment between a reading of 65 microliters at 75 measured microliters, and 120 microliters at 100 measured microliters. Between 100 and the fourth point 3616 at 150 measured microliters, adjusted values are used to fit a line segment between a reading of 120 microliters at 100 measured microliters and the default of 150 microliters at 150 measured microliters. Finally, between 150 microliters and the maximum capacity, the original calibration is used (the offset on the final segment is zero, because the offset is zero at 150 microliters). As with the sensor linearization and liquid volume corrections described above, the use of an interpolated table permits a simple and fast table look-up operation to apply the user-calibration data in a pipette 110 according to the invention.

To increase the accuracy of any given adjustment point a user should first average a number of measurements, made at the same volume setting, before entering the measured average volume as the pipette calibration volume. If a pipette calibration volume falls into the same segment that a previous calibration volume had then the latest entry will simple replace (supersedes) the previous entry; in other words, the pipette does not average calibration volumes made in the same segment (table position or interval.) The user must average volume measurements, at the same volume setting, first before initiating a user-calibration entry at a given volume setting.

The above approach assumes that a user takes calibration measurements for one volume setting at a time and enters the correct volume for that setting into the pipette before collecting data on another volume setting. If a user prefers to take calibration measurements at all volumes before entering the data into the pipette then the user must first convert a user's set of measurements into a set of calibration corrections and the order that they must be entered into the pipette. In many cases taking all the calibration data at once before entering may be more convenient and also may result in a more accurate user calibration.

The actual value of the calibration correction should not exceed a predefined maximum volume. If a user enters a volume which exceeds the maximum limit the pipette will signal an error condition.

The volume measurement displayed on the LCD 230 of a pipette 110 according to the invention will frequently take into account a raw measurement from the piston position sensor 2110, as adjusted by the sensor linearization table, the liquid volume correction table, and the user calibration table (if any). It should be further noted that other correction steps may also be necessary, and in correcting the liquid volume measurements, an additional correction table based on an unforeseen manufacturing variance (unrelated to sensor linearization) might also be necessary. Accordingly, a manufacturing correction table may also be used in a similar manner to the other tables described at length, though in most cases, for most pipettes, it should not be necessary.

It will be noted that various types of piston position sensors 2110 are possible, and in fact, several versions of a position sensing transducer 414 are listed in the description, above, of FIG. 4.

Considering the situation in more detail, a digital optical position sensing transducer 3910 is illustrated schematically in FIG. 39. As illustrated, the optical position sensing transducer 3910 includes fixed first and second emitters 3912 and 3914 and fixed first and second detectors 3916 and 3918, between which is a sliding transparent optical scale 3920 marked with a code track 3922. As the scale 3920 moves between the emitters 3912-14 and the detectors 3916-18, the code track interrupts the transmission of light. The emitters 3912-14 and corresponding detectors 3916-18 are offset slightly, such that movement of the scale 3916 in a first direction results in interruption of the path between the first emitter 3912 and the first detector 3916 slightly before interruption of the path between the second emitter 3914 and the second detector 3918. Conversely, movement of the scale in the opposite direction results in interruption of the path between the second emitter 3914 and the second detector 3918 slightly before interruption of the path between the first emitter 3912 and the first detector 3916. In this way, the processing unit 2112 can determine the direction of movement, and by counting interruptions, can determine the distance of movement as well. This scheme is well known and is described in detail in U.S. Pat. No. 6,313,460 owned by Siemens AG of Germany, issued on Nov. 6, 2001, which is hereby incorporated by reference as though set forth in full, and in numerous other patents and publications.

It will be noted that optical encoders such as the one described above suffer from some significant disadvantages. Specifically, good performance requires that the optical track be kept clean and transparent, and contamination might compromise this. Moreover, a significant amount of power is needed for the emitters 3912-14, and a relatively fast processor is needed at all times to count pulses and determine how much movement has occurred.

FIG. 40 illustrates the basic components of an inductive position sensor, as described in U.S. Pat. No. 6,005,387 owned by Mitutoyo Corp. of Japan, issued on Dec. 21, 1999, which is hereby incorporated by reference as though set forth in full, and in numerous other patents and publications. The inductive position sensor includes a fixed transceiver board 4010 with two transmission coils 4012 and 4014, and a separate pair of overlaid receiver coils 4016, configured in quadrature. The inductive position sensor further includes a sliding flag board 4018 with passive coupling coils thereon. By selectively energizing the transmission coils 4014 and 4014, and observing signals at the receiver coils 4016 (which depend on the relative phase of coupling accomplished by the coupling coils), the relative position between the transceiver board 4010 and the flag board 4018 can be determined.

FIG. 41 illustrates a capacitive position sensor, as described in U.S. Pat. No. 4,882,536 to Meyer of Switzerland, issued on Nov. 21, 1989, which is hereby incorporated by reference as though set forth in full, and in numerous other patents and publications. In this case, a fixed transceiver board 4110 includes several charge-storing plates, a first set 4112 and a second set 4114, with all plates in a set connected to each other. A sliding coupling board 4116 includes several interconnected conductive charge-coupling plates 4118. As the charge-coupling plates 4118 pass to varying degrees over the charge-storing plates 4112 and 4114, the transceiver board 4110 and the coupling board 4116 together form a variable capacitor, which can affect the characteristics of a tuned circuit in a measurable and highly reproducible way. Accordingly, the amount of overlap can be accurately and precisely determined.

There are, of course, other kinds of sensors that can be used in a hybrid manual-electronic pipette according to the invention, including digital contact code-track sensors and potentiometers (which are subject to wear and tear), and rotary encoders connected via a linkage converting linear motion to rotary, such as a rack and pinion gear (which would be subject to undesirable slack and backlash). Magnetic field sensors (such as Hall Effect or GMR sensors) may also be used with satisfactory results.

It should be noted that an inductive and capacitive sensors of the sort described in U.S. Pat. No. 6,005,387 and (referenced above) are relative position sensors only, with signals that repeat periodically over the full course of travel of the flag board 4018 (and hence the piston 412). Whereas position within a single cycle can be determined with great accuracy, overall position cannot. Consequently, some other mechanism is needed to determine which cycle out of several the piston 412 is positioned within. In an embodiment of the invention, the processing unit 2112 generally samples the signal from the piston position sensor 2110 at a relatively low sample rate, for example, around 330 Hz. If rapid movement is determined at any time using this low sample rate, then a higher sampling rate (e.g. 2 kHz) is employed until the position settles. If a transition between otherwise identical cycles (or "quadrants" in the quadrature scheme) is observed, a separate quadrant count is updated as necessary to maintain an absolute position measurement.

For example using the inductive sensor scheme described above and illustrated in FIG. 40, an arctangent table would ordinarily be used to turn the quadrature signals from the receiver coils 4016 into a linear position. As the arctangent function repeats every 180 degrees, the quadrant count is used to ensure absolute position is tracked accurately. Moreover, because of manufacturing variances, even the arctangent table is not a precise mapping of signal level to position—the sensor linearization procedure described above will "distort" the arctangent table to account for any observed nonlinearities.

Figure 42:
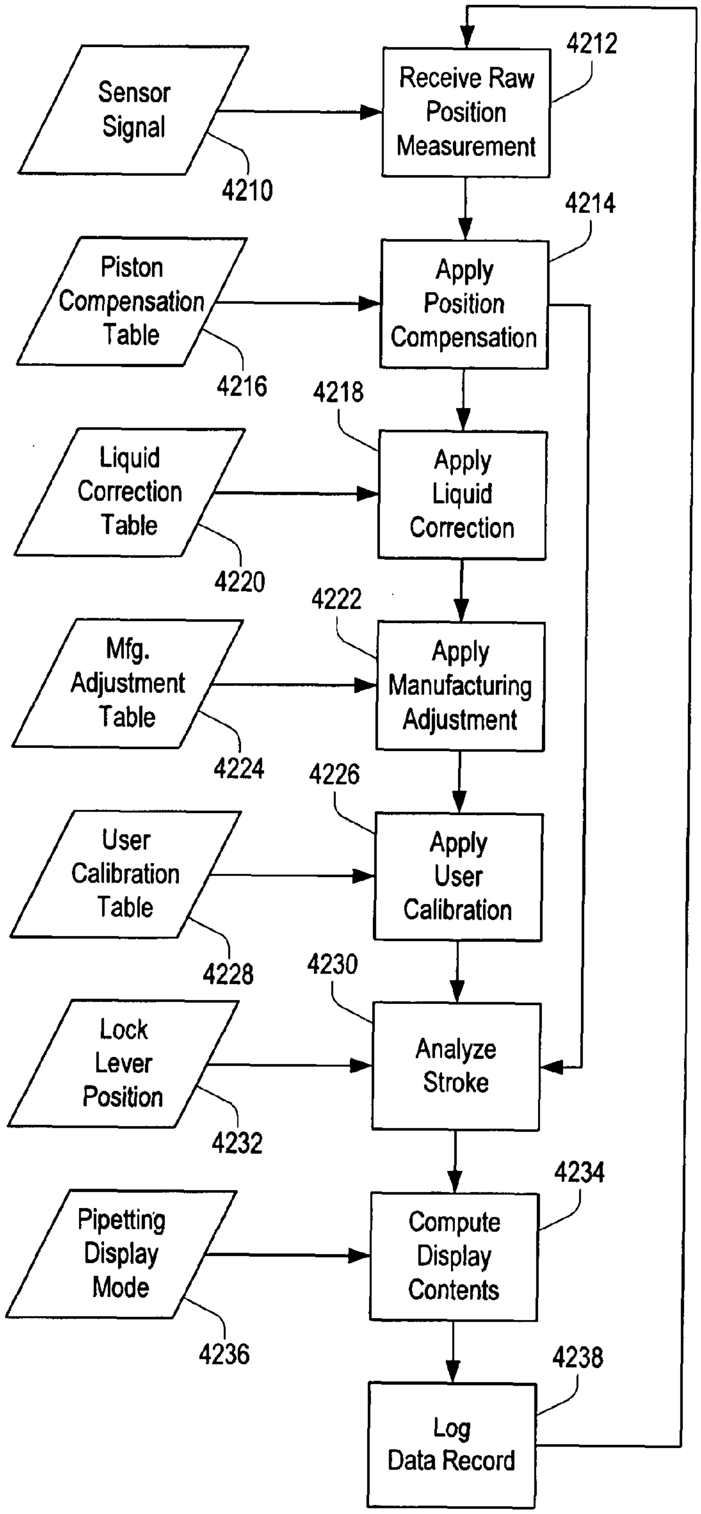
FIG. 42 is a flowchart representing a basic sequence of steps performed by a processing unit in a hybrid manual-electronic pipette according to the invention.

FIG. 42 sets forth an overview of the steps performed by the processing unit 2112 in a hybrid manual-electronic pipette 110 according to the invention. In general, the pipette 110 operates in a continuous loop, with some operations occurring in parallel with others, and certain operations being event-driven (based on signals from various components illustrated in FIG. 21) rather than procedurally determinative, but the illustration of FIG. 42 and the description set forth herein are representative in nature. Other comparable implementations are considered to be within the scope of the invention.

Initially the processing unit 2112 receives a raw (uncorrected) position measurement by way of a sensor signal 4210 obtained from the piston position sensor 2110 (step 4212). As described above, the actual position of the piston 412 is corrected by applying a compensation function (step 4214), and in the disclosed embodiment of the invention, a piston compensation look-up table 4216 is employed, which is obtained from a post-manufacturing displacement calibration operation, as it may vary from pipette to pipette. For a relative position sensor such as the capacitive or inductive sensors described above, a more detailed description of the position compensation function (step 4214) is described below with reference to FIG. 43.

After the position of the piston 412 has been calculated, a liquid correction function is applied (step 4218). As described above, in the disclosed embodiment of the invention, a liquid correction table 4220 used to perform this correction is substantially invariant from pipette to pipette, provided a standard (idealized) liquid end and tip configuration is used.

Optionally, an additional manufacturing adjustment is performed (step 4222) based on a manufacturing adjustment table 4224. As described above, after piston compensation and liquid correction operations are performed, if any inaccuracies or inconsistencies remain, the manufacturing adjustment table 4224 may be generated to correct these inaccuracies and inconsistencies, but in the disclosed embodiment it may not be necessary to apply this correction. In this case, the manufacturing adjustment table 4224 may not exist, or if it does it may be populated with zero values (representing zero offset at all measurements, which is the same as not performing any manufacturing adjustment function).

Following manufacturing adjustment, if any, a user calibration function may be applied (step 4226) if a user calibration table 4228 is present. As discussed above, user calibration data in the user calibration table 4228 is also optional, and may be either entered by the user interface 124 or transferred via the data link 2138 to the pipette 110.

Figure 45:
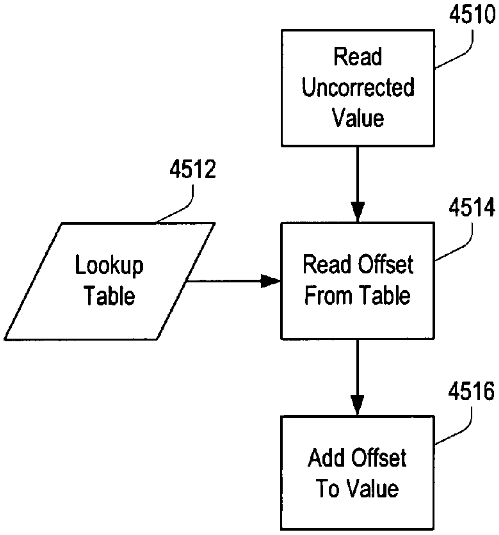
FIG. 45 is a flowchart representing a sequence of steps performed in applying a correction table to a measurement in a hybrid manual-electronic pipette according to the invention.

In the disclosed embodiment, the liquid correction, manufacturing adjustment, and user calibration functions 4218, 4222, and 4226 are all performed via a simple look-up table operation, in which the pre-correction data is used as an index into the look-up table, and data in the table is used as a simple additive offset as illustrated in FIG. 45, described below. This is a fast and simple operation even for low-power microcontrollers having a limited feature set, and hence, it is considered advantageous to implement the functions in this manner. However, other methods of applying correction functions are well known and may be used as alternatives to the look-up tables described herein.

Following all of the compensation, correction, adjustment, and calibration functions, the user's pipetting technique is analyzed during the stroke being performed (step 4230). Stroke analysis (step 4230) is described below and illustrated in FIG. 46; this analysis function generally uses the position of the piston 412 (from step 4214) and the position 4232 of the volume set lock state switch 2117 as inputs—technique analysis is disabled while the volume set lock lever 244 is unlocked.

The user interface 124 of the pipette 110 is then updated as appropriate with computed display contents (step 4234), including signaling the user of any technique violation errors that might have occurred (via the LCD 230, an LED, the audio transducer 2128, or the tactile feedback generator 2130, for example). As various pipetting display modes described above call for volume to be displayed, the volume is calculated based on the compensated, corrected, adjusted, and calibrated data obtained originally from the sensor 2110. It should be noted that the conversion from linear displacement units to volume may take place at any stage. In the disclosed embodiment, it occurs only when a value needs to be displayed, and all of the foregoing data-processing functions operate in terms of (arbitrary) linear displacement units to maintain maximum precision. However, at the time of display, the conversion is made (generally by multiplying by a known constant based on the liquid end 118 being used) and the position of a zero point, which is dependent on the pipetting display mode 4236 currently in use.

Any data records are logged as necessary (step 4238), which may depend on the presence or absence of technique violation errors or movement of the piston 412, and this process repeats in a loop as necessary.

Figure 43:
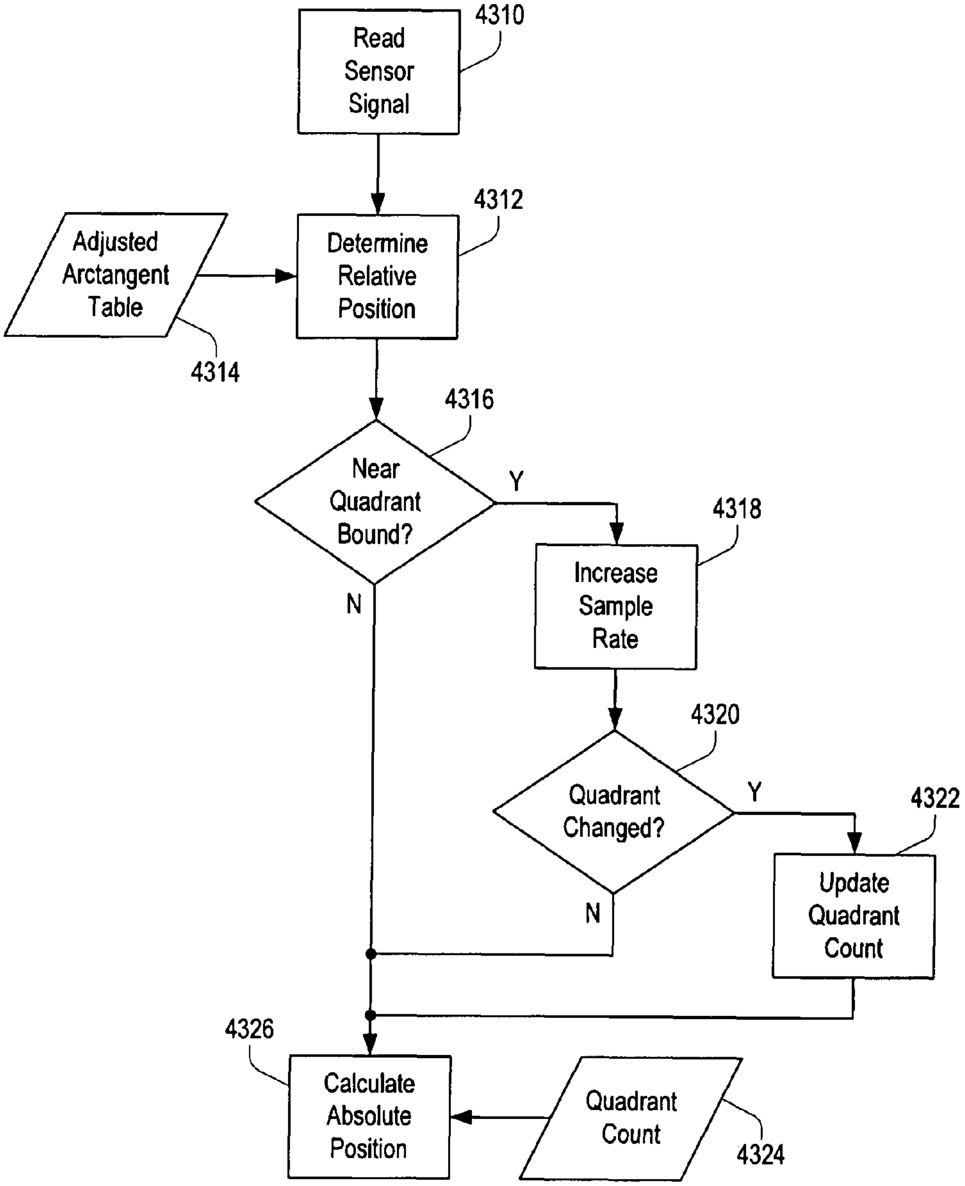
FIG. 43 is a flowchart representing a sequence of steps performed in calculating a compensated piston position from signals received from a relative position sensor in a hybrid manual-electronic pipette according to the invention.

As indicated above, the sensor signal compensation function of FIG. 42 is described in more detail with reference to FIG. 43. This function is employed when a relative position sensing technology is used, such as the capacitive or inductive sensors illustrated in FIGS. 40-41.

In the disclosed embodiment in which an inductive sensor is used, after a sensor signal is read (step 4310) from the sensor 2110, a relative position is determined (step 4312) based on an averaged plurality of samples of the sensor signal and an adjusted arctangent table 4314, which as described above is generated from an initial sensor calibration operation performed after the pipette 110 is manufactured. The arctangent function is used to convert two signals in quadrature (i.e., a Signal 1 and a Signal 2) obtained from the receiver coils 4016 into a known position within a quadrant—and the entire range of travel for the piston 412 is divided into a plurality of quadrants, as described above and illustrated in the following table:

| | Quadrant: | | | | | | |
|---|---|---|---|---|---|---|---|
| | 1 | 2 | 3 | 4 | 5 | 6 | 7 |
| Angle: | 0-90 degrees | 90-180 degrees | 180-270 degrees | 270-360 degrees | 360-440 degrees | 440-530 degrees | 530-620 degrees |
| Signal 1 polarity: | + | + | − | − | + | + | − |
| Signal 2 polarity: | − | + | + | − | − | + | + |

If the piston 412 appears to be near a boundary between two adjacent quadrants (step 4316), that is, when either Signal 1 or Signal 2 is sufficiently close to a zero-crossing, further inquiry is necessary. As described above, the sample rate is increased (step 4318) if the speed of movement of the piston 412 exceeds a threshold. In the disclosed embodiment, the sensor signal sampling rate is increased from 330 Hz to 2 kHz as necessary to identify all zero-crossings in either Signal 1 or Signal 2.

From an observation of the table above, it will be apparent that based only on the Signal 1 and Signal 2 values, there is potential ambiguity with respect to the absolute position of the piston 412. For example, Quadrant 1 and Quadrant 5 exhibit the same signal characteristics, as do Quadrants 2 and 6. Accordingly, the increased sample rate set forth above ensures that quadrant changes are always successfully tracked (step 4320) in a pipette 110 according to the invention. A quadrant count is updated (step 4322) as necessary to disambiguate the position of the piston 412. Based on the relative position calculated at step 4312 and the quadrant count 4324 (updated as necessary at step 4322), an absolute position of the piston 412 is calculated (step 4326) in a precise and accurate manner, even when the plunger button 114 is moved very rapidly.

Figure 44:
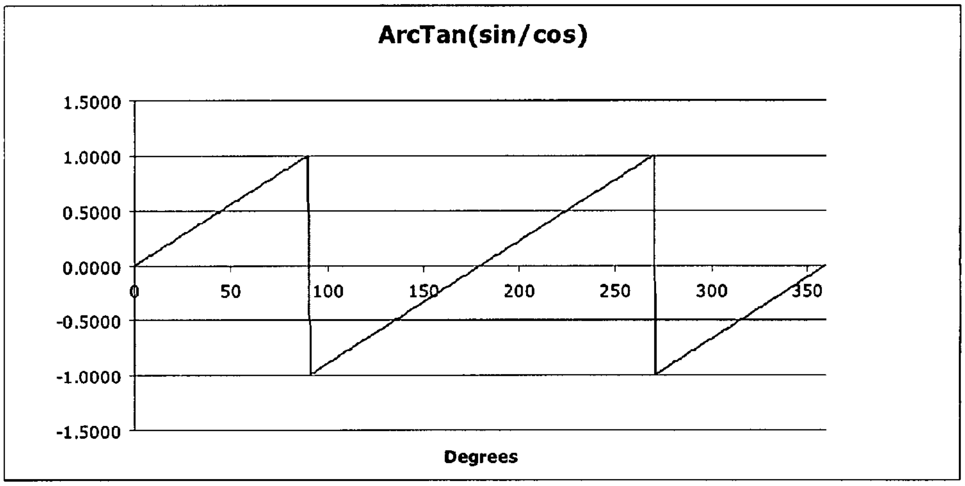
FIG. 44 is a plot of an ideal arctangent function, used to correlate sensor signals to a piston position in an embodiment of the invention.

It will further be recognized that Signal 1 and Signal 2 approximate sine and cosine functions in an inductive sensor as illustrated in FIG. 40, and accordingly, the appropriate function to convert their amplitudes to a position is the arctangent, as illustrated in FIG. 44. In other words, the ratio between Signal 1 and Signal 2 is used to calculate the position. After the ratio of the two processed analog signals is taken, a lookup table is used to determine the arctangent, scaled to a desired range. As stated earlier, the arctangent function is the ideal function; in reality, due to the actual layout of the position transducer circuit board and other physical factors, the compensation table 4314 will require slight modifications to obtain the best accuracy. This table will be empirically determined for each pipette immediately following manufacture, on an automated fixture.

The operations employed by a pipette 110 according to the invention to apply liquid correction, manufacturing adjustment, and user calibration functions (performed in FIG. 42) are all described with reference to FIG. 45. An uncorrected value is read (step 4510) and used as an index into a look-up table 4512, such that the full range of the pipette 110 maps to the size of the look-up table 4512. There need not be one-to-one mapping between positions of the piston 412 and the size of the look-up table 4512; the mapping may cause a single table entry to be applied to multiple adjacent uncorrected values. As set forth above, the table 4512 may contain 50, 64, 75, or 80 values in the disclosed embodiment, while the uncorrected position and volume values used for calculation have a much finer resolution, on the order of thousands of possible values.

The table 4512 includes a list of offset values—the appropriate value is read (step 4514) and the offset stored in the table, which may be a positive or negative value, is added (step 4516) to the uncorrected value to obtain the result.

Figure 46:
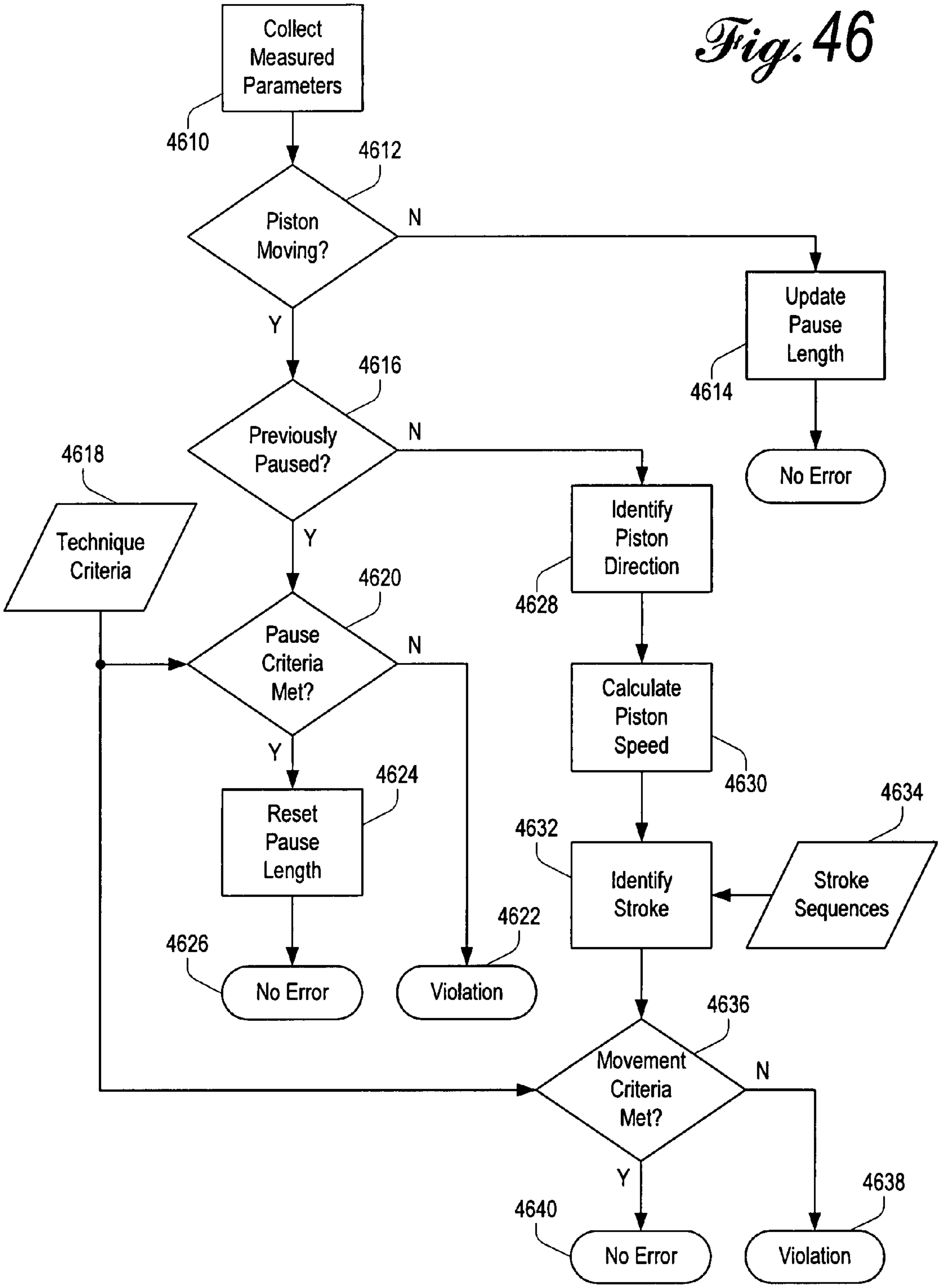
FIG. 46 is a flowchart representing a sequence of steps performed in analyzing a user's pipetting technique in a hybrid manual-electronic pipette according to the invention.

FIG. 46, as noted above, illustrates an exemplary procedure performed by the technique analysis function of a pipette 110 according to the invention. This function may employ a plurality of measured parameters (step 4610) obtained from various measurement components (as illustrated in FIG. 21) in an embodiment of the invention. Specifically, the position of the plunger 412, the direction of the plunger's movement, the speed of the plunger's movement, and a timer are particularly essential to the illustrated version of the technique analysis function. It will be recognized, of course, that other implementations of a technique analysis and verification function may be employed and are considered within the scope of the present invention.

As described above, piston movement speeds and pause lengths are particularly important measurements. Accordingly, the illustrated procedure initially determines whether the piston 412 is moving (step 4612). If it is not moving, a running count representing a pause length is updated (step 4614), and nothing else is done.

If the piston 412 is moving, and it previously was not in motion, or paused (step 4616), then an appropriate pause criterion selected from a list of criteria 4618 is checked (step 4620). For example, as described above, a minimum pause duration at a released position may be 0.8 seconds. There may be pause criteria only for certain locations, and only with respect to certain strokes or cycles; this may vary based on the pipette operating mode as described above. If the pause criterion is not met, a violation is flagged (step 4622). If it is met, the pause length is reset (step 4624) because the piston 412 is moving again, and no error results (step 4626).

If the piston 412 is moving and it was previously in motion (not paused), then the piston direction is identified (step 4628), for example, by noting the polarity of the difference between two successive piston positions. The piston speed is also calculated (step 4630), for example, by noting the magnitude of the difference between two successive piston positions. The stroke is then identified (step 4632), based on the calculated direction and speed, a history of previous strokes performed, and a stored list of expected stroke sequences 4634 depending on the pipette operating mode.

Based on the identified stroke and the pipette operating mode, one or more movement criteria in the list of technique criteria 4618 may be checked (step 4636), for example a maximum permitted stroke speed during aspiration. And as with pause lengths, if the criterion is not met, a violation is flagged (step 4638). If the movement of the piston 412 is within permissible bounds, no error is noted (step 4640).

In an embodiment of the invention, power savings are facilitated by enabling a sleep mode when the pipette 110 is not being used. If, while performing the procedure of FIG. 46, a pause length (updated at step 4614) without substantial movement of the piston 412 exceeds a large value, such as three minutes, sleep mode may be activated. In the disclosed embodiment, sleep mode is disabled upon receipt by the processing unit 2112 of an interrupt caused by the home position switch 2116. Accordingly, then, a user may bring a pipette 110 according to the invention out of sleep mode simply by depressing the plunger button 114 to home position 610.

It should be observed that while the foregoing detailed description of various embodiments of the present invention is set forth in some detail, the invention is not limited to those details and hybrid manual-electronic pipette made according to the invention can differ from the disclosed embodiments in numerous ways. In particular, it will be appreciated that embodiments of the present invention may be employed in many different fluid-handling applications. It will be appreciated that the functions disclosed herein as being performed by hardware and software, respectively, may be performed differently in an alternative embodiment. It should be further noted that functional distinctions are made above for purposes of explanation and clarity; structural distinctions in a system or method according to the invention may not be drawn along the same boundaries. Hence, the appropriate scope hereof is deemed to be in accordance with the claims as set forth below.

What is claimed is:

1. A hybrid manual-electronic pipette operative to handle a fluid, the pipette comprising:

a piston assembly comprising a manually operated piston and an electronic piston displacement sensor coupled to the piston;

a fluid-tight liquid end receiving the piston and having a distal opening permitting fluid to be picked up or discharged therethrough in response to movement of the piston within the liquid end; and a processing unit coupled to receive a piston displacement sensor signal from the electronic piston displacement sensor, wherein the processing unit includes a compensation subsystem programmed to apply a position compensation function and a volume compensation function to convert the piston displacement sensor signal to an adjusted liquid volume value.

2. The hybrid pipette of claim 1, wherein the compensation subsystem is further programmed to apply a user-settable liquid volume adjustment function characterized by a user-specified liquid volume adjustment setting.

3. The hybrid pipette of claim 2, wherein the pipette further comprises a display and an input panel, and wherein the user-specified adjustment setting is entered via the input panel and confirmed via the display.

4. The hybrid pipette of claim 3, wherein the user-specified liquid volume adjustment setting comprises at least one of a user-specified volume adjustment scaling factor, a user-specified volume adjustment zero offset, a user-specified volume adjustment translation table, or a user-specified volume adjustment transfer function.

5. The hybrid pipette of claim 1, wherein the position compensation function is characterized by a piston displacement sensor compensation setting.

6. The hybrid pipette of claim 5, wherein the piston displacement sensor signal compensation setting comprises at least one of a piston displacement sensor signal scaling factor, a piston displacement sensor signal zero offset, a piston displacement correction translation table, or a piston displacement correction transfer function.

7. The hybrid pipette of claim 6, wherein the piston displacement sensor compensation setting is pipette-specific.

8. The hybrid pipette of claim 7, wherein the piston displacement sensor compensation setting is derived from at least one measured characteristic of the pipette as determined by an initial calibration of the pipette.

9. The hybrid pipette of claim 1, wherein the volume compensation function is characterized by a liquid volume compensation setting.

10. The hybrid pipette of claim 9, wherein the liquid volume compensation setting comprises at least one of a liquid volume compensation scaling factor, a liquid volume compensation zero offset, a liquid volume compensation translation table, or a liquid volume compensation transfer function.

11. The hybrid pipette of claim 10, wherein the liquid volume compensation setting comprises a pipette model-specific component.

12. The hybrid pipette of claim 11, wherein the pipette model-specific component of the liquid volume compensation setting is derived from at least one known characteristic of the pipette that is substantially insensitive to manufacturing variations.

13. The hybrid pipette of claim 1, wherein the compensation subsystem is further programmed to calculate adjusted piston displacement values representative of linear positions of the piston in the liquid end of the pipette.

14. The hybrid pipette of claim 1, wherein the pipette comprises an air displacement pipette.

15. The hybrid pipette of claim 1, wherein the processing unit is programmed to obtain a plurality of piston displacement measurement samples at time intervals specified by a piston displacement sampling rate.

16. The hybrid pipette of claim 15, wherein the piston displacement sampling rate is variable.

17. The hybrid pipette of claim 15, further comprising a user-adjustable volume-setting stop coupled to a user-accessible adjustment mechanism, wherein a maximum fluid volume to be handled by the pipette is defined by a position of the volume-setting stop, wherein the user-accessible adjustment mechanism is lockable via a volume lock mechanism enabling the user to fix a desired volume setting, and wherein the pipette further comprises a lock switch coupled to the processing unit for identifying a lock state of the volume lock mechanism.

18. The hybrid pipette of claim 15, wherein at least a portion of the displacement sensor is coupled to the piston via a tight linkage having substantially no slack.

19. The hybrid pipette of claim 15, wherein the piston is coupled to and operated by a plunger button movable by a user, wherein the plunger button is primarily spring biased to a released position and secondarily and additively spring biased to a home position representative of a pipette capacity substantially equal to zero, and wherein the pipette further comprises a home position switch in communication with the processing unit for signaling that the piston is within a specified distance of the home position.

20. The hybrid pipette of claim 19, wherein the processing unit is programmed to change an operating parameter of the pipette when the home position switch is actuated.

21. The hybrid pipette of claim 19, wherein the operating parameter comprises a piston displacement sensor signal sampling rate.

22. The hybrid pipette of claim 19, wherein the operating parameter comprises a processing unit power consumption mode.

23. The hybrid pipette of claim 15, further comprising a human-readable display in communication with the processing unit, wherein the processing unit is programmed to display a calculated liquid volume on the human-readable display.

24. The hybrid pipette of claim 1, further comprising an acoustic transducer in communication with the processing unit and operative to provide an audio notification to a user of the pipette.

25. The hybrid pipette of claim 1, further comprising a tactile feedback generator in communication with the processing unit and operative to provide a tactile notification to a user of the pipette.

26. The hybrid pipette of claim 1, further comprising an input panel in communication with the processing unit, wherein the input panel comprises a plurality of buttons operable by a user of the pipette.

27. The hybrid pipette of claim 1, further comprising a tip immersion depth sensor in communication with the processing unit, wherein the processing unit is programmed to perform at least one of storing a value, displaying a message, displaying a value, and changing an operating parameter of the pipette in response to a measurement from the depth sensor.

28. The hybrid pipette of claim 27, wherein the depth sensor comprises an ultrasonic transducer coupled to the liquid end of the pipette.

29. The hybrid pipette of claim 1, further comprising a pipette orientation sensor configured to identify an orientation of the pipette while the pipette is in use, wherein the orientation sensor is in communication with the processing unit, and wherein the processing unit is programmed to perform at least one of storing a value, displaying a message, displaying a value, and changing an operating parameter of the pipette in response to a measurement from the pipette orientation sensor.

30. The hybrid pipette of claim 1, further comprising an accelerometer configured to identify a movement of the pipette while the pipette is in use, wherein the accelerometer is in communication with the processing unit, and wherein the processing unit is programmed to perform at least one of storing a value, displaying a message, displaying a value, and changing an operating parameter of the pipette in response to a measurement from the accelerometer.

31. The hybrid pipette of claim 1, further comprising an inclinometer configured to identify a tilt of the pipette while the pipette is in use, wherein the inclinometer is in communication with the processing unit, and wherein the processing unit is programmed to perform at least one of storing a value, displaying a message, displaying a value, and changing an operating parameter of the pipette in response to a measurement from the inclinometer.

32. The hybrid pipette of claim 1, further comprising a temperature sensor configured to identify an environmental temperature while the pipette is in use, wherein the temperature sensor is in communication with the processing unit, and wherein the processing unit is programmed to perform at least one of storing a value, displaying a message, displaying a value, and changing an operating parameter of the pipette in response to a measurement from the temperature sensor.

33. The hybrid pipette of claim 1, wherein the electronic piston displacement sensor comprises a potentiometer having a substrate and a wiper for varying the piston displacement sensor signal in response to a position of the wiper on the substrate, and wherein at least a portion of the potentiometer is mechanically linked to the piston.

34. The hybrid pipette of claim 1, wherein the electronic piston displacement sensor comprises a mechanical contact linear encoder having a conductive track and a contact for generating a digital piston displacement sensor signal in response to a position of the contact with respect to the conductive track, and wherein at least a portion of the linear encoder is linked to the piston.

35. The hybrid pipette of claim 1, wherein the electronic piston displacement sensor comprises an optical encoder having a marked track and an optical pickup for generating a digital piston displacement sensor signal in response to a position of the optical pickup with respect to the marked track, and wherein at least a portion of the optical encoder is coupled to the piston.

36. The hybrid pipette of claim 1, wherein the electronic piston displacement sensor comprises an inductive position transducer having a transmitter loop, a coupling loop, and a receiver loop for generating a time-varying piston displacement sensor signal in response to an excitatory signal applied to the transmitter loop and a displacement between the coupling loop and the transmitter and receiver loops, and wherein at least a portion of the inductive position transducer is coupled to the piston.

37. The hybrid pipette of claim 1, wherein the displacement sensor comprises a capacitive position transducer having a first capacitive plate and a second capacitive plate for generating a time-varying piston displacement sensor signal in response to an excitatory signal applied to the first capacitive plate and a displacement between the first capacitive plate and the second capacitive plate, and wherein at least a portion of the capacitive position sensor is coupled to the piston.

38. The hybrid pipette of claim 1, wherein the displacement sensor comprises a rotary encoder, and wherein at least a portion of the rotary encoder is coupled to the piston assembly through a linkage configured to convert a linear movement of the piston to a rotary motion.

39. A hybrid manual-electronic pipette operative to handle a fluid, the pipette comprising:

a piston assembly comprising a manually operated piston and an electronic displacement sensor coupled to the piston;

a fluid-tight liquid end receiving the piston and having a distal opening permitting fluid to be picked up or discharged therethrough in response to movement of the piston within the liquid end; and a processing unit coupled to receive a piston displacement sensor signal from the electronic piston displacement sensor, wherein the processing unit is programmed to calculate an adjusted liquid volume value from the piston displacement sensor signal by applying a plurality of compensation functions, wherein the plurality of compensation functions collectively translate the piston displacement sensor signal into the adjusted liquid volume value.

40. The hybrid pipette of claim 39, wherein the plurality of compensation functions includes at least one pipette model-specific calibration function and at least one pipette-specific calibration function.

41. The hybrid pipette of claim 40, wherein the pipette-specific calibration function represents a mapping between a plurality of piston displacement sensor signal values and a plurality of corresponding adjusted piston position values.

42. The hybrid pipette of claim 41, wherein the pipette model-specific calibration function represents a mapping between a plurality of adjusted piston position values and a plurality of corresponding adjusted liquid volume values.

43. The hybrid pipette of claim 40, wherein the plurality of compensation functions further comprises a user-specified calibration function.

* * * * *